US009959098B1

(12) United States Patent
Smith Devine

(10) Patent No.: US 9,959,098 B1
(45) Date of Patent: May 1, 2018

(54) DATA PROCESSING SYSTEMS AND METHODS

(71) Applicant: Sigma Sciences Limited, Stirlingshire, Scotland (GB)

(72) Inventor: Robert Laurie Smith Devine, Stirlingshire (GB)

(73) Assignee: Sigma Sciences Limited, Stirlingshire (GB)

( * ) Notice: Subject to any disclaimer, the term of this patent is extended or adjusted under 35 U.S.C. 154(b) by 0 days. days.

(21) Appl. No.: 15/069,934

(22) Filed: Mar. 14, 2016

Related U.S. Application Data

(60) Provisional application No. 62/133,427, filed on Mar. 15, 2015, provisional application No. 62/133,431, filed on Mar. 15, 2015.

(51) Int. Cl.
*G06F 9/44* (2006.01)

(52) U.S. Cl.
CPC .................................... *G06F 8/24* (2013.01)

(58) Field of Classification Search
CPC .................................... G06F 8/24
USPC .................................... 717/107
See application file for complete search history.

(56) References Cited

U.S. PATENT DOCUMENTS

| | | | | |
|---|---|---|---|---|
| 7,251,776 | B2 | 7/2007 | Handsaker et al. | |
| 7,346,485 | B2 | 3/2008 | Crowe et al. | |
| 7,752,536 | B2 | 7/2010 | Megiddo et al. | |
| 8,539,444 | B2 | 9/2013 | Cao et al. | |
| 2002/0144255 | A1* | 10/2002 | Anderson | G06F 8/71 717/174 |
| 2005/0102127 | A1* | 5/2005 | Crowe | G06Q 40/06 703/22 |
| 2005/0273311 | A1 | 12/2005 | Lautt et al. | |
| 2006/0095833 | A1 | 5/2006 | Orchard et al. | |
| 2006/0136433 | A1* | 6/2006 | Rothschiller | G06F 17/246 |
| 2007/0169206 | A1 | 7/2007 | McMullin | |
| 2007/0220415 | A1 | 9/2007 | Cheng et al. | |
| 2009/0089067 | A1 | 4/2009 | Campbell et al. | |
| 2010/0262900 | A1* | 10/2010 | Romatier | G05B 17/02 715/219 |
| 2014/0164895 | A1 | 6/2014 | Matheson et al. | |

* cited by examiner

*Primary Examiner* — Ryan D. Coyer
(74) *Attorney, Agent, or Firm* — Lodestone Legal Group; Jeromye V. Sartain

(57) ABSTRACT

A system and methods for dynamically creating spreadsheet workbooks at runtime on a computing device from a set of pre-defined spreadsheet modules. Each spreadsheet module has an associated interface definition, allowing users more easily to combine multiple modules into more complex spreadsheet applications. Interfaces are defined using a Spreadsheet Interface Definition Language (SIDL) which enables spreadsheet models to be defined independent of their implementation. Modules can be either pre-constructed as spreadsheet workbooks, or dynamically created at run time from module definitions.

25 Claims, 24 Drawing Sheets

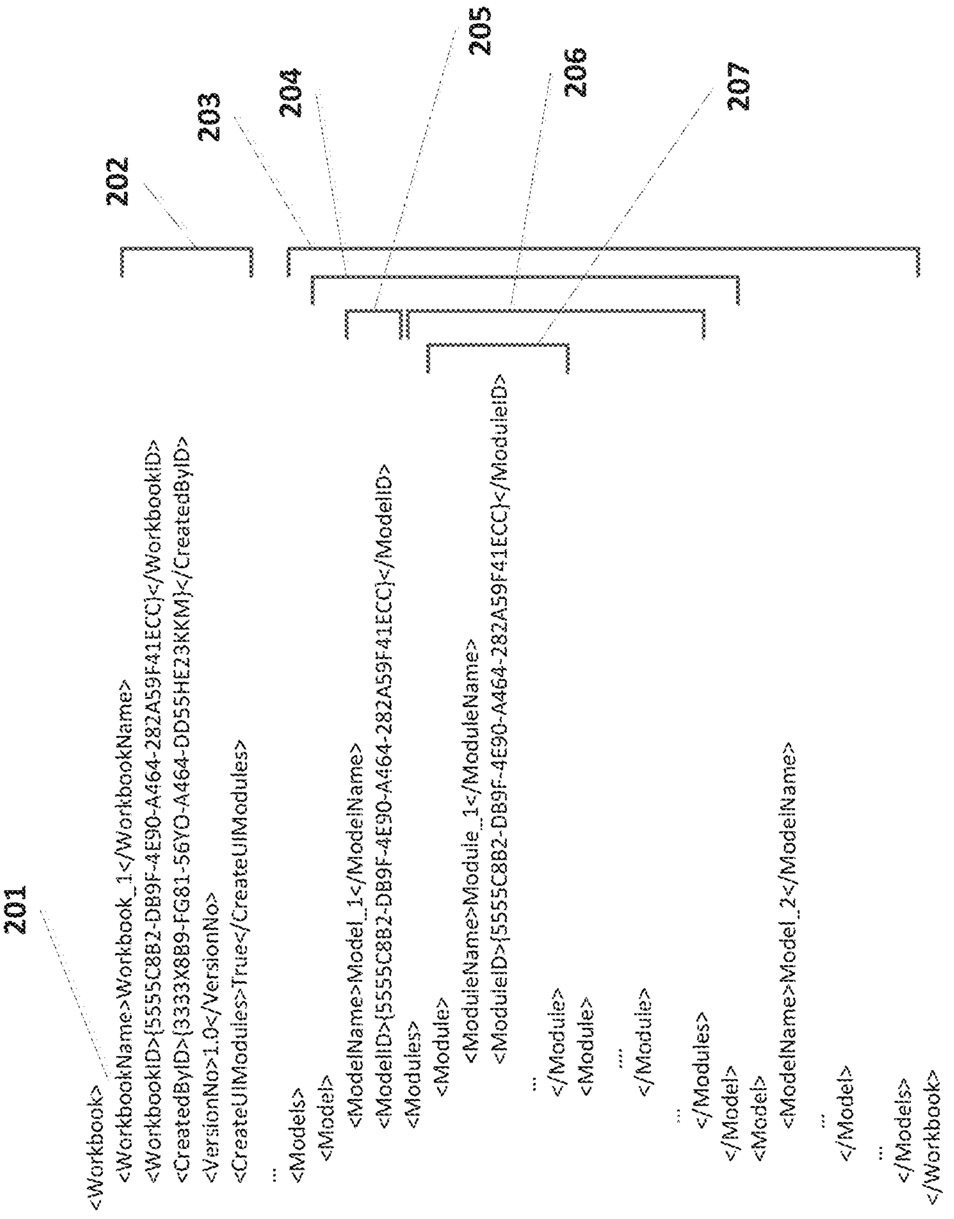

Fig. 2

```
<Workbook>
  <WorkbookName>Workbook_1</WorkbookName>
  <WorkbookID>{5555C8B2-DB9F-4E90-A464-282A59F41ECC}</WorkbookID>
  <CreatedByID>{3333X8B9-FG81-56Y0-A464-DD55HE23KKM}</CreatedByID>
  <VersionNo>1.0</VersionNo>
  <CreateUIModules>True</CreateUIModules>
  ...
  <Models>
    <Model>
      <ModelName>Model_1</ModelName>
      <ModelID>{5555C8B2-DB9F-4E90-A464-282A59F41ECC}</ModelID>
      <Modules>
        <Module>
          <ModuleName>Module_1</ModuleName>
          <ModuleID>{5555C8B2-DB9F-4E90-A464-282A59F41ECC}</ModuleID>
        ...
        </Module>
        <Module>
        ...
        </Module>
      </Modules>
    </Model>
    <Model>
      <ModelName>Model_2</ModelName>
      ...
    </Model>
    ...
  </Models>
</Workbook>
```

201, 202, 203, 204, 205, 206, 207

401 402 403 404 405 406 407 408

```
<ModuleImplementation>
  <ImplementationID>{8730C8B2-DB9F-4E90-A464-282A59F41ECC}</ImplementationID>
  <ModuleID>{8710C8B2-DB9F-4E90-A464-282A59F41ECC}</ModuleID>
  <IsActive>True</IsActive>
  <Code>
    ...
    SetCellValue(1, 1, 'Input1:');
    SetCellValue(2, 1, 'Input2:');
    SetCellValue(4, 1, 'Output1:');
    SetCellFormula(4, 2, '=Input1+Input2');
    SetCellName(1, 2, 'Input1');
    SetCellName(2, 2, 'Input2');
    SetCellName(4, 2, 'Output1');
    ...
  </Code>
</ModuleImplementation>
```

Fig. 4

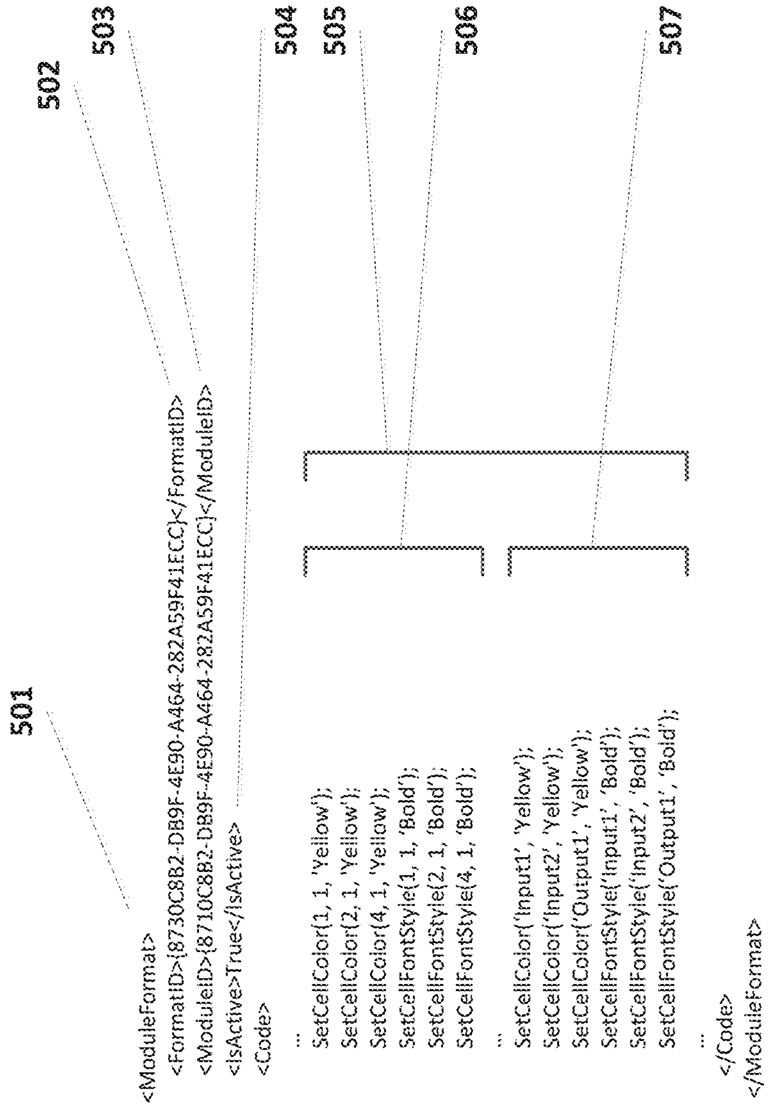

Fig. 5

```
<ModuleFormat>
 <FormatID>{8730C8B2-DB9F-4E90-A464-282A59F41ECC}</FormatID>
 <ModuleID>{8710C8B2-DB9F-4E90-A464-282A59F41ECC}</ModuleID>
 <IsActive>True</IsActive>
 <Code>
  ...
  SetCellColor(1, 1, 'Yellow');
  SetCellColor(2, 1, 'Yellow');
  SetCellColor(4, 1, 'Yellow');
  SetCellFontStyle(1, 1, 'Bold');
  SetCellFontStyle(2, 1, 'Bold');
  SetCellFontStyle(4, 1, 'Bold');
  ...
  SetCellColor('Input1', 'Yellow');
  SetCellColor('Input2', 'Yellow');
  SetCellColor('Output1', 'Yellow');
  SetCellFontStyle('Input1', 'Bold');
  SetCellFontStyle('Input2', 'Bold');
  SetCellFontStyle('Output1', 'Bold');
  ...
 </Code>
</ModuleFormat>
```

```
<Model>
  <ModelName>TestModel</ModelName>
  <ModelID>{8700C8B2-DB9F-4E90-A464-282A59F41ECC}</ModelID>
  <VersionNo>1.0</VersionNo>
  <Modules>
    <Module>
      <ModuleName>Module1</ModuleName>
      <ModuleID>{8710C8B2-DB9F-4E90-A464-282A59F41ECC}</ModuleID>
      <ContainerID>{8720C8B2-DB9F-4E90-A464-282A59F41ECC}</ContainerID>
      <ImplementationID>{8730C8B2-DB9F-4E90-A464-282A59F41ECC}</ImplementationID>
      <VersionNo>1.0</VersionNo>
      <Author>Jane Doe</Author>
      <Shared>False</Shared>
      <ModuleType>Worksheet</ModuleType>
      <Visible>True</Visible>
      <Inputs>...</Inputs>
      <Outputs>...</Outputs>
      <Implementation>...</Implementation>
      <Dependencies>...</Dependencies>
      <Formatting>...</Formatting>
    </Module>
    <Module>
      <ModuleName>Module2</ModuleName>
      <ModuleID>{9710C8B2-DB9F-4E90-A464-282A59F41ECC}</ModuleID>
      <ContainerID>{9720C8B2-DB9F-4E90-A464-282A59F41ECC}</ContainerID>
      <ImplementationID>{9730C8B2-DB9F-4E90-A464-282A59F41ECC}</ImplementationID>
      <VersionNo>1.0</VersionNo>
      <Author>John Doe</Author>
      <Shared>False</Shared>
      <ModuleType>Data</ModuleType>
      <Visible>True</Visible>
      <Inputs>...</Inputs>
      <Outputs>...</Outputs>
      <Implementation>...</Implementation>
      <Dependencies>...</Dependencies>
      <Formatting>...</Formatting>
    </Module>
  </Modules>
  <DataFlows>
      <DataFlow>
        <Source>Output1</Source>
        <Destination>Input2</Destination>
        <Visible>False</Visible>
        <DefaultValue></DefaultValue>
      </DataFlow>
      <DataFlow>
        <Source></Source>
        <Destination>Input1</Destination>
        <Visible>True</Visible>
        <DefaultValue>5</DefaultValue>
      </DataFlow>
      <DataFlow>
        <Source>Output2</Source>
        <Destination></Destination>
        <Visible>True</Visible>
        <DefaultValue></DefaultValue>
      </DataFlow>
      <DataFlow>
        <Source></Source>
        <Destination>Input3</Destination>
        <Visible>False</Visible>
        <DefaultValue>100</DefaultValue>
      </DataFlow>
  </DataFlows>
</Model>
```

```
<Module>
  <ModuleName>Sheet1</ModuleName>
  <ModuleID>{8710C8B2-DB9F-4E90-A464-282A59F41ECC}</ModuleID>
  <ParentID>{8720C8B2-DB9F-4E90-A464-282A59F41ECC}</ParentID>
  <ImplementationID></ImplementationID>
  <VersionNo>1.0</VersionNo>
  <Author>Jane Doe</Author>
  <Shared>False</Shared>
  <ModuleType>DynamicData</ModuleType>
  <Visible>True</Visible>
  <Inputs>
    <Input>{5590X8E5-RE7F-4B32-U313-769A59F41QWM}</Input>
  </Inputs>
  <Outputs>
    <Output>DataSet_1</Output>
  </Outputs>
  <Internal></Internal>
  <Dependencies></Dependencies>
  <ImplementationID>{3320C8E5-DB7F-4E46-A464-282A59F41EDW}</ImplementationID>
  <FormattingID>...</FormattingID>
</Module>
```

Fig. 16(a)

```
<ModuleImplementation>
  <ImplementationID>{3320C8E5-DB7F-4E46-A464-282A59F41EDW}</ImplementationID>
  <ModuleID>{8710C8B2-DB9F-4E90-A464-282A59F41ECC}</ModuleID>
  <IsActive>True</IsActive>
  <Code>
    SELECT * FROM Customers
  </Code>
</ModuleImplementation>
```

```
<DataSource>
  <DataSourceID>{5590X8E5-RE7F-4B32-U313-769A59F41QWM}</DataSourceID>
  <IsActive>True</IsActive>
  <SourceType>Database</SourceType>
  <SourceName>DBServer1</SourceName>
  <SourceLocation>192.168.1.123</SourceLocation>
</DataSource>
```

Fig. 16(c)

DATA PROCESSING SYSTEMS AND METHODS

RELATED APPLICATIONS

This application claims priority pursuant to 35 U.S.C. § 119(e) to and is entitled to the filing dates of U.S. Provisional Patent Application Ser. No. 62/133,427, filed Mar. 15, 2015, and U.S. Provisional Patent Application Ser. No. 62/133,431, filed Mar. 15, 2015. The contents of the aforementioned applications are incorporated herein by reference.

TECHNICAL FIELD

These teachings pertain to data processing systems and methods, and in particular to a way of providing spreadsheet workbooks for data processing applications.

BACKGROUND

Spreadsheets are ubiquitous in modern business and almost all businesses rely on them for at least some of their business processes. Spreadsheets have become so popular primarily due to their accessibility and flexibility—users with specific domain knowledge can quickly learn to build powerful business applications without requiring the input of IT professionals. These user-created spreadsheets can in many cases be regarded as "user-defined software applications"—i.e. applications that have been created without the participation of professional software developers.

The accessibility and ease-of-use of spreadsheets comes at a price, however: spreadsheets are usually uncontrolled within the organisation and are highly prone to errors. The causes of such errors are numerous, and include lack of control over versioning, multiple versions of the same file being used and the mixing of models and data in a single file.

An aim of our disclosure is to put the use of spreadsheets onto a more robust and rigorous footing, while at the same time ensuring that the resulting system can be exploited by users who do not have any software development skills. The resulting spreadsheet-based systems can be built by users who need only be skilled in the use of spreadsheets, not in the development of computer software.

In typical usage, what is commonly referred to as a "spreadsheet" is in fact a file (or a "workbook") that is populated by one or more spreadsheet worksheets. The spreadsheet model and associated data will normally be distributed across multiple worksheets, and a workbook will often contain more than one model. Spreadsheet workbooks are commonly stored on disk as a file, either on the user's desktop computer or mobile device, or on a network shared folder. In some cases, spreadsheet workbooks are stored within a database as a binary object. A spreadsheet workbook can be regarded as a container that holds spreadsheet objects (or modules) such as worksheets, charts and scripts and manages the interaction of these objects with the spreadsheet engine.

The single-file architecture of spreadsheet workbooks means that models and data are often duplicated, usually combined in the same file, and will often be out-of-date. In an effort to promote model re-use, and to help keep data separate from models, many users exploit a feature of modern spreadsheet software (e.g. Microsoft Excel, OpenOffice Calc, LibreOffice Calc, to name a few examples) called "linked workbooks". In this configuration, the name and location of the spreadsheet workbook containing the data is stored within the workbook containing the model. When the model workbook is opened the spreadsheet software attempts to open any referenced linked data workbooks.

In practice, the use of linked workbooks can be problematic: Users can re-name linked workbooks and they can be moved to a different location, or even deleted. When a linked workbook is stored on a network then additional problems can arise. This is particularly true for mobile networks where connections can be unreliable and data transmission rates can be low.

Another major problem with the standard file-based spreadsheet implementation is that opportunities for model re-use are very low, even with linked workbooks. Users will often end up "re-inventing the wheel" or having multiple copies of spreadsheets that have very small differences in their design. To compound the problems, without version control users are often unsure which model is the "correct" one to use.

A typical spreadsheet workbook with a typical calculation model will comprise one or more worksheets with some combination of the following:

- Formulas in worksheet cells for performing calculations
- Static data used in calculations
- Dynamic data used in calculations (e.g. retrieved from a web service)
- User-supplied input values
- Cell formatting information
- "Reporting" objects such as charts and pivot tables
- (Optionally) user-defined functions created using a scripting language With all of these objects combined into a single file, re-use is difficult to achieve. User-defined functions can be consolidated into a single workbook which is then linked-to from the model workbook. However, the same problems with linked workbooks that are encountered with external data workbooks also apply here.

Another method for improving the management of spreadsheet models is the creation of so-called Spreadsheet Services. In a Spreadsheet Service the spreadsheet engine is normally located on a computer server, which is in turn located on a computer network. This network can be either a LAN or a WAN. In the service model the user initiates a service request from their device and the request parameters are dispatched to the remote service. Upon arrival at the service provider device, the parameters are applied to the spreadsheet associated with the service, the spreadsheet is recalculated and the resulting output values are returned to the user's device. This is a standard "web service" model—it just so happens that the data processing is carried out by a spreadsheet.

By locating the service on a central server, complete control can be exercised over the model and data. The obvious disadvantage of this approach is that it removes the creation and deployment of the spreadsheet from the domain, or expert, user and puts it in the hands of the software professional. In addition, it does nothing to solve the problem of model re-use since it is still based on the single-file approach.

Module-based software development (usually combined with interface information in the form of associated metadata) is well known to practitioners. Systems also have been described in the patent literature that apply these concepts to spreadsheets and involve models and module documents, associated information describing the inputs and outputs, and information on how modules are connected together. These proposals, however, are still based on a document-centric approach to spreadsheet design and management.

Given the problems described above with existing spreadsheet implementations, it is clear that a need exists to provide a system and methods that give a user the capability to build robust and re-usable spreadsheets that can be more easily managed and controlled. Such a system must provide a user experience that is as close to the standard spreadsheet application as possible, if the advantages of spreadsheets for the user are not to be lost.

These teachings describe an approach to spreadsheets that represents a move away from a document-centric approach to one focused on functional entities, metadata and data. Spreadsheets have traditionally been treated in the same manner as "dumb" documents such as word processing documents (e.g. those created using Microsoft Word) and presentation documents (e.g. those created using Microsoft Powerpoint). Management of spreadsheets has consequently been carried out using standard document management systems.

By treating spreadsheets as composites of functional, style and data entities we realise a number of significant advantages that would not be possible in the document-centric approach. In particular, the system provides a means of achieving code/module reuse and creates a framework for building robust User Defined Applications (UDA) based on spreadsheet models.

SUMMARY

These teachings pertain to data processing systems and methods for providing runtime dynamically composited spreadsheet workbooks for data processing applications, wherein the provision of the modules that form the composited whole are sourced from one or more repositories. These repositories can be located on a computer network or on a user's device (such as a PC or tablet).

According to a first aspect of the disclosure there is provided a data processing system which provides a runtime dynamically generated spreadsheet workbook.

Optionally, the workbook is generated according to one or more module definitions which each specify one or more spreadsheet objects and a set of inputs and outputs.

A "spreadsheet object" is a constituent element of a spreadsheet that can be logically separated and defined. A spreadsheet object can itself be composed of multiple spreadsheet objects. In practice, the definition of an object will be dependent on the details of the user's application and on the degree of granularity they require: Higher levels of granularity provide more flexibility in re-usability but are more difficult to manage. For example, a generated or composited workbook could be defined as a collection of individual worksheet cells (i.e. single-cell range objects). In this case the user has defined the constituent objects with a high degree of granularity. Alternatively, a composited workbook could be defined as a collection of worksheets, i.e. with a lower degree of granularity. A composited workbook can then be defined as a collection of objects of differing degrees of granularity.

Optionally, relationships between different module definitions are defined by one or more module interface definitions and associated data flows which define mappings between module inputs and outputs.

Optionally, the data processing system incorporates a module factory that generates spreadsheet objects from module definitions.

Optionally, the data processing system includes a module compositor that generates composited workbooks from one or more spreadsheet objects.

Optionally, the data processing system includes a spreadsheet engine that manages and executes dynamically generated workbooks.

Optionally, the data processing system comprises one or more definition repositories which store one or more of: (a) a module interface definition (MID), (b) a module definition (MD), and (c) a Data Flow definition.

Optionally, the one or more definition repositories are located on one or more computer network connected devices.

Optionally, the one or more definition repositories are located on a user's device.

Optionally, spreadsheet module definitions are categorized according to whether they are functional, data, reporting, data visualization or visual styling.

Optionally, a spreadsheet module comprises multiple submodules.

Optionally, a module definition comprises software code that is executed in a module factory in order to create a spreadsheet object.

Optionally, the module definition software code is stored in (a) a file or (b) a database.

Optionally, the module definition software code is stored in a version control system.

Optionally, the software code from more than one module definition is combined to create a composite workbook definition.

Optionally, the software code defining the composite workbook definition is executed in a scripting engine in order to create a dynamically composited spreadsheet workbook at runtime.

Optionally, the software code defining the composite workbook definition is compiled into a binary software library and exposed as a function or procedure call.

Optionally, a spreadsheet workbook is obtained as a returned value from a function or procedure call to the binary software library.

Optionally, a module interface definition can act as the ancestor to a descendent module interface definition; and/or a module definition can act as the ancestor to a descendent module definition.

Optionally, a globally unique identifier (GUID) identifies one or more of (a) a module interface definition (MID), (b) a module definition (MD), (c) a Data Flow definition and (d) a composited spreadsheet workbook.

Optionally, custom attributes are injected into a workbook and its constituent worksheets at runtime.

Optionally, the module definitions comprise reporting definitions, functional definitions and styling definitions, and said reporting, functional and styling definitions are separated from each other.

Optionally, spreadsheet modules are composited on a user's device and appear to the user as (a) a standard single spreadsheet workbook user interface or (b) a styled user interface with the spreadsheet functionality concealed.

Optionally, the data processing system comprises a software code compiler.

Optionally, the software code compiler generates compiled code libraries of worksheet functions.

Optionally, the data processing system comprises a software code compiler that generates compiled code libraries exporting functions that in turn generate spreadsheet objects such as worksheets.

According to a second aspect of the disclosure there is provided a method of data processing, comprising dynamically generating a spreadsheet workbook at runtime.

According to a second aspect of the disclosure there is provided a computer program product comprising instructions, that, when executed on a computing device, enable it to function as a data processing system comprising a runtime dynamically generated spreadsheet workbook, or as a client or viewer of such a data processing system.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

These teachings describe a system wherein a spreadsheet workbook is dynamically assembled at runtime within the operating memory of a computing device from one or more modules that are in turn retrieved from one or more module repositories. From the viewpoint of the user, the spreadsheet workbook appears as any other single-document spreadsheet workbook, the dynamic composition taking place in the background without requiring any intervention from the user. The workbook is dynamically assembled within the operating memory of the device and can be cached in any non-volatile memory for off-line working. A device can be any one of a range of computing devices including, but not limited to, smart phones, tablets, desktop PCs and servers.

A spreadsheet workbook as commonly used will typically have the following objects contained within it:

- Worksheets with formulas
- Worksheets containing data
- Worksheets containing formulas and data
- Software scripts defined by the user for implementing user-defined functions An aspect of these teachings is that a spreadsheet module is defined to be a set of one or more of the above objects, with a defined set of input and output points. As an example, an input or output point on a worksheet could be a range of one or more cells on the worksheet. Throughout these teachings the terms "module" and "spreadsheet module" will be used interchangeably.

In addition to the functional and data objects above, a spreadsheet workbook will also typically contain reporting objects such as:

- Charts for the visualization of data (or other graphical visualization objects)
- Other reporting objects (e.g. pivot tables)

Modular concepts are fundamental to software development and are ubiquitous in the craft. The aims of such modular approaches are primarily two-fold:

- Improved design and testability by splitting an application into smaller functional units
- Opportunities for code re-use The modular approach to spreadsheet modelling is also well known and is often implemented in the form of linked workbooks. In linked workbook implementations, the interactions between the different workbooks are mediated through a primary, or controller, workbook. Advantageously, the current teachings describe a method of implementing a novel modular approach that does not require an external controller and that is particularly suited to the development of sophisticated User Defined Applications (UDA). In particular, and advantageously, our approach presents a single workbook to the user within the spreadsheet application, who need have no knowledge of how it has been constructed.

Other spreadsheet-reuse strategies have been proposed, based on the sharing of spreadsheet objects. However, this suffers from a disadvantage in that the way an object is implemented can change, and before long the system will be overloaded with a large number of objects which differ only slightly from each other. In addition, such object-sharing strategies do not separate the functional aspects from the visual aspects, leading to multiple objects that can be functionally identical yet with a different appearance. Further, such approaches to date still employ a document-centric approach to spreadsheet composition and management.

In these teachings we introduce a more rigorous approach to module re-use in spreadsheets, and provide detailed descriptions of various embodiments. In particular, a preferred embodiment of our system involves the runtime (dynamic) creation of modules from module definitions, which are then inserted into a module container, constituting a dynamically-created spreadsheet workbook.

Spreadsheet modules can be broadly categorized into the following three groups:

- Processing modules
- Data modules
- Presentation modules

Processing modules include, but are not restricted to, worksheets with embedded formulas, computer program scripts and communications modules. A data module can be comprised of one or more worksheets that contain static data, or can be dynamically populated at runtime using data from an external source such as a relational database. Presentation modules include charts and other data visualization and reporting elements.

Advantageously, our system allows for separation of the different elements of a spreadsheet:

- Separation of functional interfaces and functional implementations
- Separation of functional aspects from visual aspects
- Separation of functional aspects from data entities
- Separation of functional and data entities from reporting objects The latter separation is advantageous: Different users will often require different reports and our approach advantageously allows them to derive these from a common set of functional and data modules.

Another aspect of these teachings is the ability to define module types that are not found in standard spreadsheet workbooks. We define some additional module types that can be used to extend the functionality of a dynamically composited workbook:

Styled worksheet modules

Dialog worksheet modules (for user inputs)

Worksheet range modules

Events module for responding to specified events within the workbook

Communications module for inter-process or inter-workbook communication

Data retrieval module, e.g. for querying a relational database

A key aspect of our approach is that the inputs and outputs of a spreadsheet module are described using a Spreadsheet Interface Definition Language (SIDL). The information contained in a module's interface definition is such that different modules can be interconnected in ways that ensure an output from one module matches the required input for a connected module. A spreadsheet model can then be defined in terms of a collection of module interface definitions combined with information on interface links.

In addition, by defining an interface definition for a module, it can be incorporated into a larger model without any reference to the details of how the module is actually implemented. This is a key property of interfaces—the implementation details of a module can be changed without affecting the interface definition. At the same time, once an interface has been released for general use (i.e. published) it cannot be modified, since this could potentially lead to existing multi-module model definitions becoming invalid.

It is important to understand the difference between a module interface definition (MID) and a module definition (MD): The latter is used to dynamically create an instance of a module at runtime, while the primary purpose of the MID is to define the inputs and outputs to/from a module as well as any external dependencies. A single MID can be associated with multiple MDs, with each MD defining a different implementation.

A further aspect of these teachings is that a spreadsheet workbook file is considered to be a module container and can contain one or more of the above objects. In a preferred embodiment, such a workbook file does not, however, exist as a stored workbook document in the usual sense. Rather, it is initialized at runtime from a stored workbook definition and is then populated with any prescribed modules. Throughout these teachings we will use the terms "module container", "parent module container", "container workbook" and "parent container" interchangeably depending on the context.

A feature of these teachings is the ability to define a relationship between a module interface definition and a parent module container definition. The module container definition (which defines the container workbook) is tagged and identified by using a suitably unique identifier, such as a Globally Unique Identifier (commonly known as a GUID). Modules are also tagged and identified with a similar identifier and in addition can be tagged with a source workbook identifier which identifies the original spreadsheet workbook from which the module was derived (if applicable). This structure allows all modules and sub-modules to be easily managed and tracked. The module GUID is included within its Interface Definition (using the SIDL). Different implementations of a module are identified by an Implementation Identifier (also a GUID).

An important feature of our approach to building a module definition is that it takes account of dependencies on other modules. For example, a worksheet module can incorporate formulas that are provided by code modules external to the worksheet module, but that do not have any external visibility through the input and output sections in the interface definition. It is important that such internal dependencies are made visible through the module definition.

A further aspect of our approach is that it provides a means for separating the implementation of a module from its visual presentation properties (in other words, how the spreadsheet cells are formatted).

A further aspect of these teachings involves a method of dynamically constructing a spreadsheet workbook from modules contained within one or more other spreadsheet workbook containers. In other words, although a non-document-centric approach is the preferred embodiment of our approach, the system is also compatible with the document-centric approach to spreadsheet objects. The dynamically composited workbook is constructed by copying all specified modules from each of the source workbook containers, and inserting them into the specified module container along with any dynamically constructed modules.

In this way a user can utilise modules of different types without restriction. Certain implementations can also involve copying the binary module objects from source containers into the new dynamically constructed host workbook container. As an example, a static data module could comprise a stored worksheet which could then be extracted from its container workbook and combined with dynamically-created worksheets defined using the IDL.

Another aspect of these teachings involves a method of dynamically constructing a spreadsheet workbook from modules and sub-modules that are defined using a suitable Module Definition Language (MDL). Formats used for such an MDL can be in a number of forms, including, but not limited to, Extensible Markup Language (XML), Javascript Object Notation (JSON) or a section of text describing a computer program or script.

A feature of all modern spreadsheet applications is the ability to create User-Defined Functions (UDF). For example, in Microsoft Excel this can be achieved either by using the Visual Basic for Applications (VBA) scripting engine, or by creating compiled libraries known as XLLs. A further aspect of these teachings involves the ability to dynamically compile computer code UDF modules into compiled libraries at runtime. This "embedded compiler" functionality can be provided independently of the dynamic generation of a spreadsheet workbook at runtime. That is, it can be provided whether a workbook is dynamically generated at runtime or not.

Advantageously, however, our system is also designed to allow the development of applications based on spreadsheet processing but which do not have the cell-like appearance of a spreadsheet user interface. A number of schemes have been proposed or implemented for building spreadsheet user interfaces involving controls such as buttons, edit boxes, list views etc. This dichotomy between spreadsheet cells and user interface controls is universal: For example, in Microsoft Excel the controls that can be embedded in a worksheet are generated using a separate mechanism and in turn require additional controlling software to link the controls to the spreadsheet.

The grid-of-cells approach to spreadsheet user interfaces is so prevalent that the notion of arranging spreadsheet cells in any other configuration has not been suggested before. An aspect of our approach is that it allows for non-standard cell arrangements and behaviours and this is achieved through the use of styled worksheet modules. By using appropriate styling a worksheet can be made to appear as a standard self-contained software application, allowing its spreadsheet origins to be concealed. In addition, this approach allows for the creation of dialog worksheets that handle user input. Hence, by the inclusion of a styling engine that works in conjunction with the spreadsheet engine our system provides all elements required for application development.

The dynamically composited nature of our approach provides a powerful mechanism for deploying spreadsheet services. In the service model a set of input values is sent from the user's device to a remotely located spreadsheet service, inserted into a spreadsheet engine and the calculated outputs are then extracted and sent back to the user's device. Dynamic composition allows us to create a system where only the required functionality is incorporated into the spreadsheet engine, which has positive implications for system scalability.

A further architectural implementation of our approach is to use a so-called "grid"—i.e. a network of connected computing devices each of which acts as a host for runtime dynamically composited workbooks. The systems and methods described in these teachings provide means for implementing highly scalable and flexible distributed computation systems.

It is important to realise that the present teachings do not constitute a template-file system: A template file is a partial entity containing static data combined with placeholders for dynamic data. The template file is then processed by a presentation system and combined with the dynamic data to generate a static output file or report. Template-file systems are by definition document-centric in nature.

The key features of our system mean that it can be implemented using existing spreadsheet engines, that it does not require an external controller of any kind and that it need not affect the expected user experience. In particular, once a dynamically-composited spreadsheet workbook has been defined, it can be made to appear as any other spreadsheet workbook to the user.

Yet another aspect of these teachings involves a computer apparatus. A preferred embodiment of this apparatus includes computer network shared data storage, one or more computing devices connected to the computer network shared data storage and a spreadsheet engine on at least one of the connected devices. The apparatus further includes a module factory that takes module definitions as input and creates spreadsheet modules from those definitions. In addition, the apparatus includes a compositor that takes the generated modules and combines them into spreadsheet workbooks according to the workbook definition retrieved from the repository. The compositor can also be used to combine dynamically generated modules with static modules (or worksheets) extracted from spreadsheet workbooks.

Although we use a computer network with associated connected devices to illustrate the methods of these teachings, this is not a requirement. The principle of a dynamically constructed spreadsheet workbook is applicable to a single computing device, irrespective of its status with regard to network connectedness. In this case, all repositories and processing elements are located on the single device. In fact, even the spreadsheet service approach can be implemented on a single device.

Although our focus in these teachings is on using runtime dynamic composition as a means of moving away from the document-centric approach currently used for spreadsheets, the same methods can be used to improve that same document-centric approach. For example, workbooks can be composited as a disk-based document that can be stored on the user's device and accessed like any other spreadsheet document. Any changes to the constituent modules would then be transmitted to the user's device and the spreadsheet document would then be re-composited.

The disclosure also provides various other features which are described in more detail below but which can be summarised herewith:

Parsing Workbooks

PW1. A data processing system comprising a spreadsheet workbook parser that converts a spreadsheet workbook into a software code-based representation.

PW2. A data processing system as in PW1 that processes the code-based representation of a spreadsheet workbook and which separates the code into functional, data, reporting and formatting elements.

PW3. A data processing system as in PW1 that allows the user to choose a sub-section of a spreadsheet workbook before parsing and hence to define a workbook module.

PW4. A data processing system as in PW3 that processes the code-based representation of a module and which separates the code into functional, data, reporting and formatting elements.

PW5. A data processing system as in PW4 that allows the user to extract separate functional, data, reporting and formatting sub-modules from the source workbook module.

PW6. A data processing system as in PW5 that allows the user to specify module definitions from each sub-module code representation.

PW7. A data processing system as in PW6 that allows the user to create a module interface definition associated with a module definition.

In-Memory Linked Workbooks

LW1. A data processing system where a module definition incorporates a property indicating it's average computational requirement.

LW2. A data processing system where multiple dynamically composited workbooks are created in the device's operating memory and where these in-memory workbooks are linked.

LW3. A data processing system where the computational requirement measure of a module is used to determine the number of module instances to generate at runtime, and where multiple module instances can be created each in separate dynamically composited linked workbooks and those workbooks can be assigned to different processor cores or other computational units.

LW4. A data processing system as in LW2 where the multiple dynamically composited in-memory linked workbooks are linked using named pipes.

LW5. A data processing system as in LW2 where the multiple dynamically composited in-memory linked workbooks are linked using sockets.

LW6. A data processing system as in LW2 where the multiple dynamically composited in-memory linked workbooks are linked using memory-mapped files.

LW7. A data processing system as in LW2 where the multiple dynamically composited in-memory linked workbooks are linked using a messaging mechanism such as in-built operating system messaging or an external messaging scheme.

Worksheet Modules

WM1. A data processing system where a module definition generates one or more spreadsheet worksheets.

WM2. A data processing system as in WM1 where the worksheet module contains static data.

WM3. A data processing system as in WM1 where the worksheet module contains one or more worksheet formulas.

Worksheet Objects

WO1. A data processing system where a module is comprised of one or more spreadsheet worksheets.

WO2. A data processing system as in WO1 where a worksheet module stores it's module interface definition as a custom attribute within one or more of the worksheets.

Format Modules

FM1. A data processing system where a module definition specifies the visual formatting for an associated functional, data, reporting or data visualization module.

FM2. A data processing system as in FM1 where a user can specify a personal formatting module to be used with a functional module.

Range Modules

RM1. A data processing system where a module definition specifies a range of cells on a spreadsheet worksheet, known as a Range Module Definition.

RM2. A data processing system as in RM1 where a range module definition contains static data.

RM3. A data processing system as in RM2 where a range module definition contains one or more worksheet formulas.

RM4. A data processing system as in RM1 where a range module definition is comprised of a dynamic named range.

RM5. A data processing system as in RM1 where a range module is linked to a worksheet module at runtime and any required named ranges are automatically created.

RM6. A data processing system as in RM5 where multiple range modules are composited into a single worksheet module.

Code-Based Modules

CB1. A data processing system where a module is comprised of a computer program or script which specifies a user-defined worksheet function.

CB2. A data processing system as in CB1 where the software code module comprising the user-defined function is compiled to a binary software library at design time using a code compiler integrated into the module design user interface, and where the compiled library is dynamically linked to the spreadsheet engine after the library creation.

CB3. A data processing system as in CB1 where the software code comprising the user-defined functions is dynamically compiled at runtime into a binary software library by a code compiler incorporated within the module factory, and where the compiled library is dynamically linked to the spreadsheet engine after the library creation.

CB4. A data processing system as in CB1 where the software code comprising the user-defined functions is stored as a script within the module and is executed by a scripting engine associated with the spreadsheet engine.

CB5. A data processing system as in CB4 where the software code comprising the user-defined functions is stored as a custom attribute in the dynamically composited workbook.

CB6. A data processing system as in CB2 which incorporates a code editor within which a user can create and edit user defined functions based on software code.

CB7. A data processing system as in CB6

CB7. A data processing system as in CB3 where the software code comprising a user-defined function can be automatically updated from the module repository when the module definition is updated by a user.

CB8. A data processing system as in CB3 where a binary software library is used in conjunction with a worksheet module that is used solely to manage inputs to and outputs from one or more software code modules.

Data Modules

DS1. A data processing system where a module is comprised of a static dataset stored in a module definition.

DS2. A data processing system where a module is comprised of a static dataset stored in a spreadsheet worksheet.

DS3. A data processing system where a module is comprised of the location details and retrieval instructions for a data source.

DS4. A data processing system where a module is comprised of a dataset that is stored in a spreadsheet worksheet using a dynamic named range and which data is dynamically retrieved from an external data source.

DS5. A dataset module as in DS4 where the external data source is a relational database.

DS6. A dataset module as in DS4 where the external data source is a NoSQL database.

DS7. A dataset module as in DS4 where the external data source is a streaming data feed.

Styled Worksheet Module

SWM1. A data processing system where a worksheet module is a styled module.

SWM2. A data processing system as in SWM1 where the styling system determines the behaviour of worksheet cells as well as their appearance, in a manner similar to the cascading style sheets used in web browsers.

SWM3. A data processing system as in SWM1 where the styling information associated with a styled worksheet module is retrieved from a module repository.

SWM4. A data processing system as in SWM1 where the styling applied to the module provides functionality required for a dialog worksheet, enabling a user to enter input values.

SWM5. A data processing system as in SWM2 where a worksheet cell is styled to appear and function as a button.

SWM6. A data processing system as in SWM2 where a worksheet cell is styled to appear and function as a checkbox.

SWM7. A data processing system as in SWM2 where a worksheet cell is styled to appear and function as an edit box (or text edit).

SWM8. A data processing system as in SWM2 where a worksheet cell is styled to appear and function as a radio button.

SWM9. A data processing system as in SWM2 where a group of worksheet cells is styled to appear and function as a list view.

SWM10. A data processing system as in SWM2 where a group of worksheet cells is styled to appear and function as a dropdown list (or combobox).

SWM11. A data processing system that incorporates a user interface for designing and managing worksheet styles.

User-Interface Modules

UIM1. A data processing system where a worksheet module is configured as a user-interface (UI) module, with said UI module acting as the source module for model input values and the display element for model output values and reporting objects, and where said UI module acts as a proxy for a dynamically composited workbook.

UIM2. A data processing system as in UIM1 where a user-interface (UI) module is automatically created according to the module definition Data Flow properties.

UIM3. A data processing system as in UIM1 where a user-interface (UI) module is streamed to the user's device and where the UI module acts as a proxy for a dynamically composited workbook on a remote device, where the inputs and outputs on the UI module match the inputs and outputs defined for the dynamically composited remote workbook.

UIM4. A data processing system as in UIM1 where the input values entered into the UI module are streamed to the corresponding inputs in the dynamically composited workbook.

UIM5. A data processing system as in UIM1 where the output values generated in the dynamically composited workbook are streamed back to the corresponding output fields of the UI module.

UIM5. A data processing system as in UIM1 where the UI module and the remote workbook are located on the same device.

UIM6. A data processing system as in UIM3 where the UI module and the remote workbook are linked using named pipes.

UIM7. A data processing system as in UIM3 where the UI module and the remote workbook are linked using sockets.

UIM8. A data processing system as in UIM3 where the UI module and the remote workbook are linked using a messaging system.

UIM9. A data processing system as in UIM3 where the UI module incorporates some of the functional aspects of a model.

UIM10. A data processing system as in UIM1 where the UI module is derived from a styled worksheet module.

UIM11. A data processing system as in UIM3 where the UI module is loaded into a harness application that manages module retrieval and dispatch/receipt of all values to and from the composited workbook.

UIM12. A data processing system as in UIM1 where the input and output ranges are mapped to the equivalent ranges on the dynamically composited workbook by convention. "By Convention" is meant that they are mapped according to name: e.g. an input cell "Input1" in the UI module will be mapped to an input cell "Input1" in the dynamically composited workbook.

IUM13. A data processing system that includes a host software application which has the purpose of loading a user interface module that comprises mappings of the input and output cells of a composited workbook. Said host software application to include functionality that transmits the input values entered into the user interface spreadsheet workbook to a remote instance of the composited workbook, and said host application to retrieve and display any output values returned from the remote composited workbook in the output cells of the user interface spreadsheet workbook.

System Configurations

SC1. A data processing system where the module factory is located on the user's device.

SC2. A data processing system where the module factory is located on a remote device.

SC3. A data processing system as in SC1 where the module compositor is located on the user's device.

SC4. A data processing system as in SC2 where the module compositor is located on a remote device.

SC5. A data processing system as in SC3 where the spreadsheet engine is located on the user's device.

SC6. A data processing system as in SC4 where the spreadsheet engine is located on a remote device.

SC7. A data processing system as in SC6 where input and output values are sent to and retrieved from the remote device via an application interface, such as a web browser, on the user's device.

SC8. A data processing system as in SC6 where there are multiple remote devices arranged in a grid configuration and each device, each having a module factory, compositor and spreadsheet engine, operates as a calculation node on the grid.

SC9. A data processing system as in SC8 where calculation nodes are linked using named pipes.

SC10. A data processing system as in SC8 where calculation nodes are linked using sockets.

SC11. A data processing system as in SC8 where calculation nodes are linked using a messaging system.

Document-Centric Compatibility

The methods and systems described in these teachings can also be applied in document-centric scenarios.

DC1. A data processing system which generates dynamically composited workbooks from a combination of spreadsheet module definitions and document-centric spreadsheet object modules.

DC2. A data processing system as in DC1 where the one or more spreadsheet object modules is contained within a spreadsheet workbook document file (the container workbook).

DC3. A data processing system as in DC1 where the one or more spreadsheet object modules is contained within a spreadsheet workbook document binary object stored within a database.

DC4. A data processing system as in DC1 where a spreadsheet object module is comprised of one or more spreadsheet worksheets.

DC5. A data processing system as in DC1 where a spreadsheet object module is comprised of one or more formulas contained within a spreadsheet worksheet.

DC6. A data processing system as in DC1 where a spreadsheet object module is comprised of a spreadsheet worksheet containing a dataset.

DC7. A data processing system as in DC1 where the container workbook is used to store a GUID as a custom attribute which is in turn used to manage the workbook document.

Models

M1. A data processing system where a spreadsheet model definition is defined by a combination of one or more module definitions.

M2. A data processing system as in M1 where the model definition is built by defining a series of data flows, or mappings, between module interface definition outputs and inputs.

M3. A data processing system as in M1 where the absence of a Data Flow mapping for an input cell signifies it as a user-input cell and the absence of a Data Flow mapping for an output cell signifies it as a reporting output.

M4. A data processing system as in M2 where the set of inputs and outputs for the defined model are used to define a set of scenarios for the model.

M5. data processing system as in M2 where the Data Flows can be manipulated to create different model definitions from a single set of module definitions.

M6. A data processing system as in M2 where the connection between an output of a first module and an input of a second module is established by inserting a formula referring to the output of the first module in the worksheet cell specified as the input cell for the second module.

Repositories

R1. A data processing system where the definition repository is a relational database.

R2. A data processing system where the definition repository is a NoSQL database.

R3. A data processing system where the definition repository is a Source Control system.

R4. A data processing system as in R3 where the definition repository is a Distributed Source Control system.

R5. A data processing system where the definition repository is a flat file.

R6. A data processing system where the definition repository is a hierarchically-structured file, including but not restricted to XML-format.

Editing and Version Management

EVM1. A data processing system as in R3 where a module or interface definition is checked out from the source control system for editing by a user.

EVM2. A data processing system as in EVM1 which includes a module factory providing for a module definition to be processed and a spreadsheet object created ready for editing.

EVM3. A data processing system as in EVM2 where the module definition is stored in the editing user interface after processing by the module factory.

EVM4. A data processing system as in EVM3 wherein the user initiates a Save action which in turn generates an updated module definition in the editing interface memory.

EVM5. A data processing system as in EVM4 wherein a Save action also initiates the generation of a delta, being the difference between the last definition version and the new definition.

EVM6. A data processing system as in R3 where the Source Control system provides a facility to re-generate all previous versions of a module definition.

Offline Working

OW1. A data processing system wherein the composited spreadsheet workbook definition can be saved to the user device's permanent storage for off-line working.

OW2. A data processing system as in OW1 wherein the locally-stored composited spreadsheet workbook definition is encrypted on disk.

OW3. A data processing system as in OW1 wherein the individual modules comprising the locally-stored composited spreadsheet workbook definition can be incrementally updated from the module definition repository.

Attributes

A1. A data processing system where metadata describing a module is stored within the module as a custom attribute.

A2. A data processing system as in A1 where the metadata is stored separately in the repository and is merged into the dynamically created spreadsheet workbook at runtime as a workbook or worksheet custom attribute as required.

Application Development

AD1. A data processing system where a dynamically composited spreadsheet workbook forms the core functionality of a software application.

AD2. A data processing system as in AD1 where the user interface elements are created from styled worksheets.

Grid Architecture

GA1. A data processing system comprising a plurality of runtime dynamically-composited workbooks distributed amongst a plurality of connected computing devices.

Applications

A1. A data processing system where the modules comprising the dynamically composited workbook implement a business rules engine.

A2. A data processing system where the modules comprising the dynamically composited workbook implement a data mining application.

A3. A data processing system where the modules comprising the dynamically composited workbook implement a statistical analysis application.

A4. A data processing system where the modules comprising the dynamically composited workbook implement a continuous process simulation application.

A5. A data processing system where the modules comprising the dynamically composited workbook implement a discrete process simulation application.

A6. A data processing system where the modules comprising the dynamically composited workbook implement an Expert System application.

A7. A data processing system where the modules comprising the dynamically composited workbook implement an Analytic Hierarchical Processing (AHP) application.

A8. A data processing system where the modules comprising the dynamically composited workbook implement an e-Learning application.

A9. A data processing system where the modules comprising the dynamically composited workbook implement an Options Pricing application.

A10. A data processing system where the modules comprising the dynamically composited workbook implement a Futures Pricing application.

A11. A data processing system where the modules comprising the dynamically composited workbook implement a trading application.

Methods

M1. A method for defining a spreadsheet model which comprises a list of included spreadsheet modules and the associated relationships amongst said modules and which also comprises a list of named inputs that are in turn associated with named ranges in the composited spreadsheet workbook. The model will also include named outputs that are associated with named ranges in the spreadsheet workbook. Since the outputs of a module can be the inputs of another module, the model inputs will generally form a subset of all possible module inputs, although not necessarily so.

M2. A method for defining a user interface module that contains copies of the defined inputs and outputs of a composited model spreadsheet workbook and that contains a reference to the globally unique identifier of the composited model spreadsheet workbook.

BRIEF DESCRIPTION OF THE DRAWINGS

The present disclosure will be described, by way of example only, with reference to the accompanying drawings, which show the following:

FIG. 2: High-level XML-based view of the structure definition for a dynamically composited workbook.

FIG. 4: Illustrative example of a Module Implementation Definition (MImpD) created using software code and XML.

FIG. 5: Illustrative example of a Module Format Definition (MFmtD) created using software code and XML.

FIG. 11: Exemplary Model Interface Definition showing an example DataFlow mapping.

FIGS. 16(*a*)-(*c*): Examples of Dynamic Data Module definitions in XML.

DETAILED DESCRIPTION OF PREFERRED EMBODIMENTS

These teachings describe a system and methods for generating dynamically composited spreadsheet workbooks on a computing device (CD) or within a distributed computer network or system containing servers, databases and Connected Computing Devices (CCDs). The CDs and CCDs may include any suitable type of data processors including, but not limited to, computer servers, super computers, workstations, personal computers, portable computers, hand held computers, tablet computers, smart phones, as well as measuring systems, sensors and various types of mobile devices having some type of embedded data processor and memory.

By "dynamically composited" is meant that the spreadsheet workbook is assembled upon request (i.e. at runtime) from a pre-existing set of modules or module definitions, either on the requesting device or on a separate device from which it is then deployed to the requesting device or to a different device which is specified separately. A key feature of our approach is that it is specifically not document-centric: Our approach does not rely on a pre-existing spreadsheet workbook into which spreadsheet objects are imported but instead an in-memory container workbook is dynamically created to host the dynamically generated spreadsheet modules. From the perspective of the spreadsheet user the composited workbook can be specified to appear as any other spreadsheet workbook: Their user experience is unaffected by the dynamic composition of the workbook.

By way of example, and without limitation, we will often describe embodiments of the present disclosure within the context of a data analysis application. The disclosure may, however, be embodied in many different forms and to many different application areas. It should not be construed as being limited to the embodiments or application areas set forth herein. The embodiments described are provided in order that this disclosure be thorough and complete, and that it fully conveys the scope of the disclosure to those skilled in the art.

The system described herein can be implemented through a software application designed to perform the required workflows and management tasks. Advantageously, however, our approach also allows the different elements of the system to be managed using existing spreadsheet software through the implementation of an add-in or similar extension that provides the required additional functionality.

Figure 1:
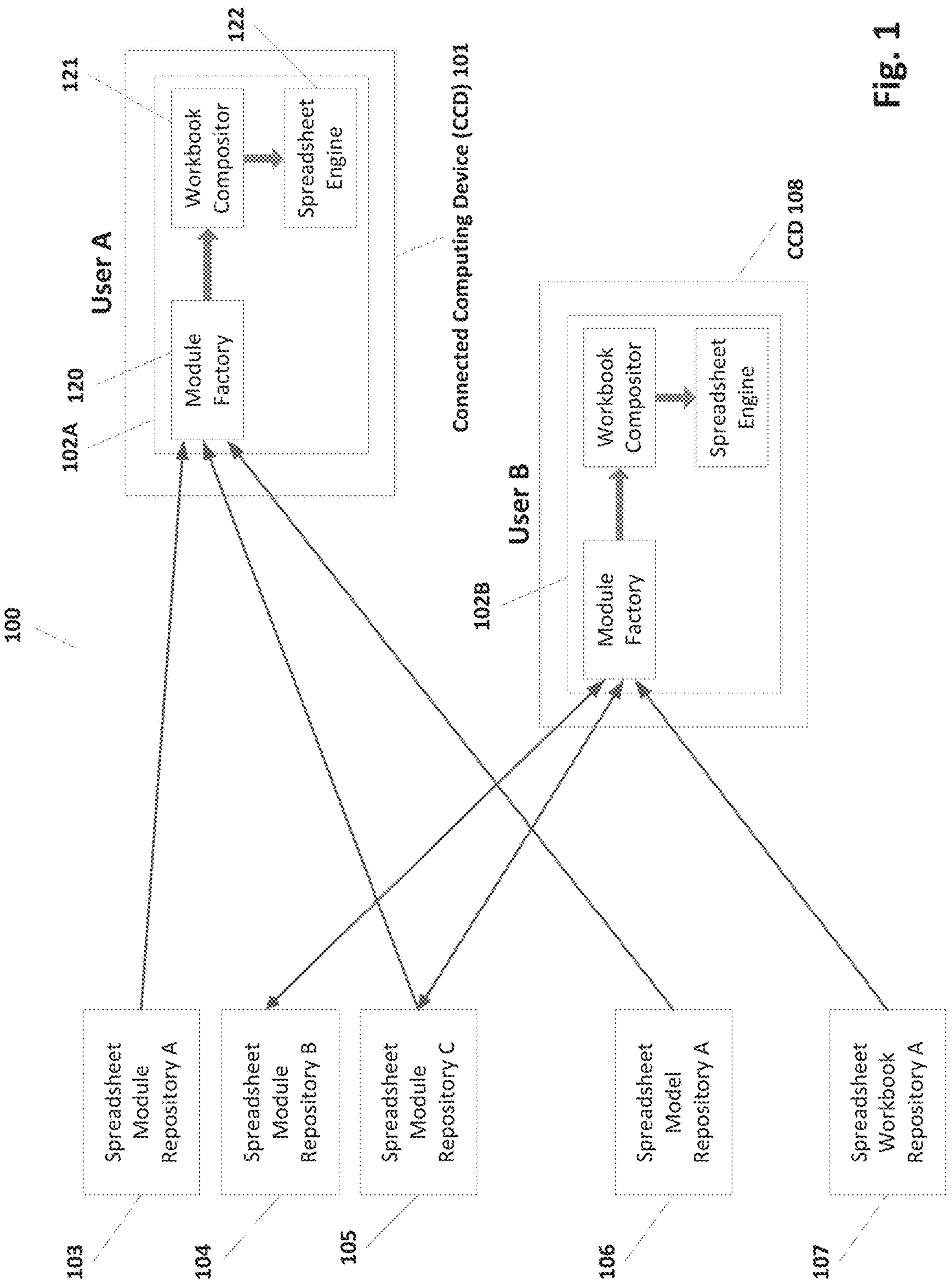
FIG. 1: High-level conceptual diagrammatic depiction of dynamically composited spreadsheet workbooks.

FIG. 1 illustrates, in simplified overview, a high-level conceptual diagrammatic depiction of an example system embodying our approach within a computer network. The system 100 of FIG. 1 is conceptual in that it may be made of two or more networked computing devices and storage. A wide range of implementations are possible incorporating different combinations of the elements illustrated in FIG. 1, and for the purposes of illustration we discuss only two of them. Other operational scenarios will be readily understood from these two examples.

In operational overview, a user A operates a computer 101 configured with a spreadsheet application 102A that allows the user to browse for lists of spreadsheet module definitions, spreadsheet model definitions and spreadsheet workbook definitions held in a number of connected repositories (103-107). User A uses the spreadsheet application to select one or more modules from the repositories, and to specify how the selected modules will be connected to one another. This design stage determines the functionality of the dynamically composited spreadsheet workbook that will be constructed on the user's device.

In the example shown for User A, the application 102A retrieves module definitions from Module Repository A 103 and Module Repository C 104 and model definitions from Model Repository A 106 as they are selected by the user. A model repository holds definitions composed of a number of modules that have been pre-configured in a particular operational configuration. The application 102A automatically retrieves the modules required for the model. The application 102A includes a module factory 120 that processes the definitions and creates instances of the specified spreadsheet objects.

These instances are then further processed by the workbook compositor 121 that merges the various spreadsheet objects into a unified spreadsheet workbook that is in turn inserted into the spreadsheet engine 122. This compositing takes place entirely within the operating memory of the computing device 101.

The operational scenario illustrated by User B is slightly different: In this case the user has retrieved only a spreadsheet workbook definition from the workbook repository 107. In a workbook definition, the constituent modules and models, and their interactions, have already been specified beforehand. In this operational scenario the user is effectively opening a spreadsheet workbook, and the system is designed to ensure the user experience is a familiar one.

After User B selects the required workbook definition, the application 102B then automatically retrieves the required modules from the module repositories and processes them via the module factory and compositor. For illustration, FIG. 1 shows modules as being retrieved from repositories B 104 and C 105.

It is important to understand that the operational scenario employed by User A could also be employed by User B, and vice-versa. Other combinations of repository and module/model/workbook definition can clearly also be employed. These embodiments should not be construed as being the sole ones possible, but are provided in order that this disclosure be thorough and complete, such that they fully convey the scope of the disclosure to those skilled in the art.

In addition, it should be understood that a module repository is designed to serve up any and all information required to construct a dynamically composited workbook. Such information will include, but is not restricted to:

- Module interface definitions
- Module definitions
- Styling definitions
- Static data modules
- Metadata, including custom attributes Advantageously, our approach makes extensive use of interfaces and a Spreadsheet Interface Definition Language (SIDL) to build the module, workbook and model definitions described here. The following sections now describe the implementation of these definitions in more detail, initially focusing on the creation of modules based on worksheets.

Interface Definition Language

In current spreadsheet software the workbooks are normally saved to disk using Extensible Markup Language (XML) format files. For example, even in Microsoft Excel a standard ".xlsx" workbook file is simply a compressed XML-based structure. After opening a file, the spreadsheet application parses it and populates the spreadsheet cells according to the contents of the XML. This is the document-centric approach: i.e. all of the contents are stored in a single file. In our approach, we focus on defining re-usable and testable functional entities (or modules) and data definitions that can be assembled to create more sophisticated workbooks.

In order for spreadsheet modules to be re-usable they must provide information on how they should be linked with other modules. In addition, information such as version number and owner name, amongst others, are required to be stored with the module definition. In these teachings, we introduce the concept of using a Spreadsheet Interface Definition Language (SIDL) to define the structure of a spreadsheet module, and to define the structure of the composite model that results from aggregating one or more modules.

It is important to realize that a module interface and structure can be defined independent of the implementation within the module. This means that the details of the implementation can be changed at a future date without, in principle, modifying the module interface structure.

By way of example, and without limitation, we describe embodiments of a SIDL based on XML. The use of XML is solely to illustrate the principles involved, and another SIDL implementation can be substituted. An example of such an alternative is Javascript Object Notation (JSON).

FIG. 2 illustrates a high-level view of the interface definition for a dynamically composited workbook. In this case we use XML to describe the structure of the workbook interface. This example is intended to illustrate the main points of the structure: In practice there will be other information incorporated into the complete workbook definition and the ellipsis indicate additional entries not required for the current discussion. At the top level is the Workbook node 201, which wraps all constituent elements. Associated with the Workbook node are several tags 202 that provide management information for the workbook definition. Note that the tags shown are exemplary only, and many other options are possible, although at a minimum a WorkbookID would be specified.

The Models section 203 is where the one or more models involved in the workbook are defined. A model 204 is a collection of one or more modules and the introduction of this additional conceptual layer to the workbook definition provides flexibility in how the modules are interconnected, as will be discussed in detail in the section on data flows. As in a Workbook, a Model will have top-level management information 205 with at least a ModelID being specified.

Within each model section 204 there is a list of modules that are involved in a model, defined in the Modules section 206. As in the model interface, for each module we should specify at least an identifier in the management information (ModuleID). In fact, because the identifier is a GUID this is the only parameter we need specify for a module since we can easily find any other parameters by querying the module repository using the ModuleID. The simplest workbook will comprise a single module, which also defines a single model.

The system provides for each of the levels of a workbook definition (Workbook/Model/Module) to be published separately on the network, and different users will have different levels of access to each level. For example, end-users will normally have access only to the published workbook list: When they open a workbook definition it will be composited to appear as any other workbook on their device, and they need have no knowledge of how it was constructed. Business analysts, on the other hand, will normally have access at all levels, having the ability to create modules and to define models based on one or more modules.

Module Interface Definition

Figure 3:
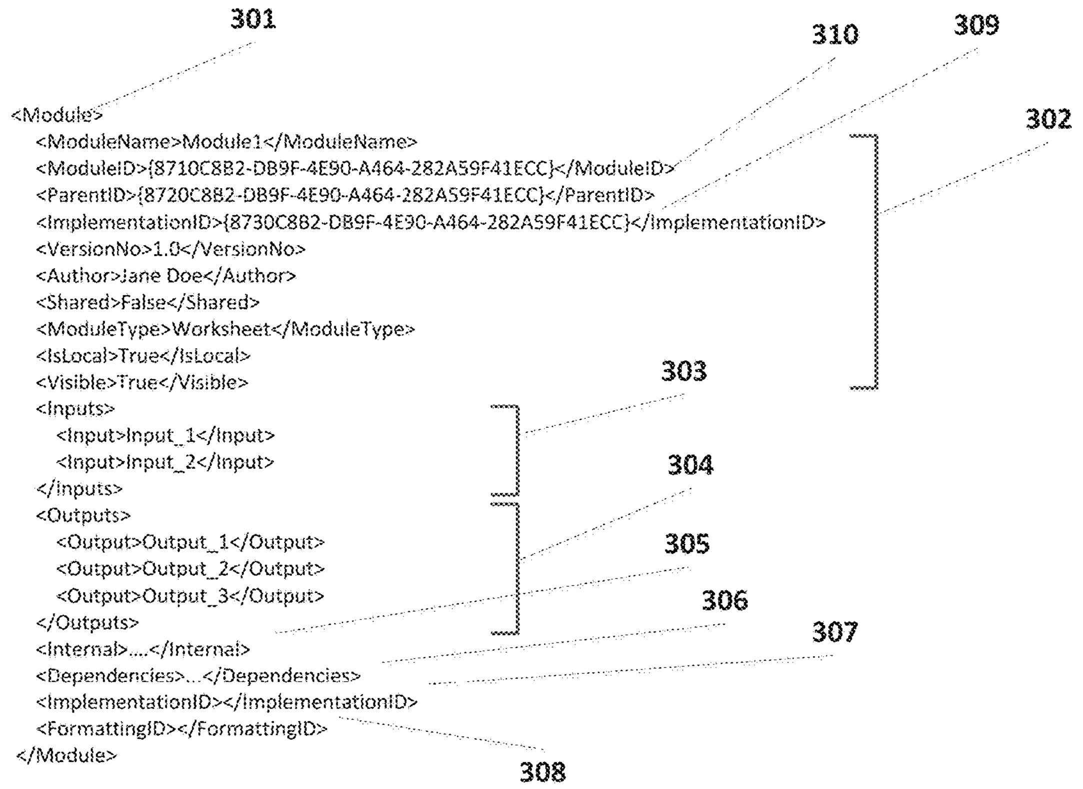
FIG. 3: Illustrative example of a Module Interface Definition (MIntfD) created using XML.

An illustrative example of a Module Interface Definition (MIntfD) created using XML is shown in FIG. 3. In this example, under the top-level Module node 301, we have management-type properties 302 such as Module Name, Version No. and Author. Note that the interface definition contains no information on how the module is implemented or how it is visually formatted. The MIntfD defines how the module interacts with external modules and imposes no constraints on how the module is implemented, or how it is visually formatted.

The most common type of module in a spreadsheet workbook will be one based on worksheets, and for an interface the key properties of such a module are the cells that hold the input data (Inputs), the cells that hold the output data (Outputs) and information on any external dependencies. The Inputs and Outputs in the module definition are indicated by the <Inputs> 303 and <Outputs> 304 tags respectively and are individually defined as named ranges within a workbook rather than as worksheet cell addresses. These map to named cell ranges in a spreadsheet workbook (or module) and the use of these ensures that the module inputs and outputs can be tracked, irrespective of their address on a worksheet. The use of named ranges in a spreadsheet, rather than cell addresses, as a means of simplifying data management is well known to those skilled in the art.

In addition to Inputs and Outputs, an MIntfD will normally include a list of internal named ranges, indicated by the <Internal> tag 305 in FIG. 3. These are named ranges that might be involved in intermediate calculations when the module is linked to another module. As such, they require to be identified in order to link them to other cells in other modules during the compositing stage.

Once it has been published and used in a real-world system, an interface definition should never be changed. To do so would potentially disrupt any module-to-module relationships, model and workbook definitions that have been constructed by users. Advantageously, our approach provides a means of cloning an existing module interface definition, with the derived definition being assigned a new identifier. In order to track the evolution of module interfaces, the interface definition includes a ParentID tag 309, which is set equal to the ModuleID 310 of the source (i.e. parent) interface definition. If the ParentID 309 is blank then this indicates that the interface has no parent.

The MIntfD also contains information on external dependencies, i.e. functions that are provided by other modules such as User Defined Functions (UDFs), but which are not made visible for linking in the module interface definition. In the example shown in FIG. 3 these are indicated by the <Dependencies> tag 306.

A special case of the worksheet module definition described here is a Range Module. As the name implies, this is a module that specifies a range of cells on a worksheet, but which is defined without reference to a parent worksheet. At runtime one or more range modules can be composited into a worksheet object which is in turn defined as part of the workbook definition.

FIG. 3 also shows tags relating to how the module is implemented 307 and to how it is formatted 308: We now discuss these in more detail.

Module Implementation Definition

As described earlier, the conventional document-centric approach to spreadsheets involves the use of XML to describe the entire contents of the spreadsheet workbook, saved as a single file (or document). Using the modular approach coupled with the SIDL described in these teachings, our system could also be implemented in a document-centric manner, with the contents of the worksheets specified as an XML-based document or as a binary file object. XML has many advantages but also has disadvantages. One disadvantage of particular relevance to our system is that it is relatively difficult, and computationally expensive, to compare two XML documents and generate a set of differences.

Advantageously, these teachings describe a means of incorporating software code as a way of defining the implementation of a spreadsheet module, rather than a purely XML structure. This implementation code is then executed by a Module Factory (item 120 in FIG. 1) after the module definition is retrieved from the repository. By combining this code-based approach with a SIDL using XML, JSON or a similar structure, we derive a hybrid structure for a spreadsheet workbook definition that is ideally suited to creating dynamically-composited workbooks.

An illustrative example of a Module Implementation Definition (MImpD) implemented using XML and software code is shown in FIG. 4. Here we can see the top-level ModuleImplementation node 401 followed by the management information 402, 403, 404 that determines how the definition is used:

The implementation identifier (ImplementationID) 402

The associated MID identifier (ModuleID) 403

IsActive 404

The ImplementationID 402 is required in order to uniquely identify the implementation definition. The ModuleID 403 is also necessary, since the implementation is tied uniquely to a module interface definition (MIntfD). Other tags can be considered exemplary, as before, although IsActive 404 is a tag that would normally be incorporated.

The implementation code is in the <Code> section 405 and the example shown is for a simple module that adds two numbers (Input1 and Input2) with the result being associated with Output1. The first three lines in the <Code> section 406 just set some headers for the named cells that will hold the input and output values. The last three lines 407 set names for the three cells adjacent to the header cells that will hold the input and output values. The middle line 408 sets a formula in the output cell (with name "Output1") that defines the relationship between the output and the two inputs. The code shown is intended to be exemplary only, and there are numerous other code syntaxes that could be used. In addition, we have ignored the parts of the code section that create the worksheet (or any other required steps) and these are represented by the ellipsis.

It is important to realise that this code does not implement the functionality of the module, as has been proposed in some other approaches. Rather it is used within a module factory to create an instance of a spreadsheet object: The resulting spreadsheet is still managed by a spreadsheet engine. In fact, the code used to create a spreadsheet object, such as a worksheet, could be compiled into a binary library, with an exported function that returns an instance of a spreadsheet object when called. In such an implementation we can see that a spreadsheet document need never exist on file: it is defined only at runtime by a function call with some (optional) input parameters. This concept can be extended such that a plurality of compiled libraries (or a single library with a plurality of functions) generate a plurality of spreadsheet objects that are in turn consolidated into a single workbook according to pre-defined module mappings.

The MIntfD-MImpD relationship is a one-to-many relationship: There can be multiple implementations for a single interface definition. Normally, only one of the implementations will be marked as Active at any one time. When this is the case, the older implementation versions would be marked as InActive.

Referring back to FIG. 3, we can further understand the relationship between the implementation definition and the module interface definition. As already mentioned, once it has been published and used in a real-world system, an interface should never be changed. To do so would potentially disrupt any module-to-module relationships or model definitions that have been constructed by users. The underlying module implementation, on the other hand, can be changed as required. Each implementation will also have a unique identifier 402 and it is this that will be used in the module interface (307 in FIG. 3).

It should be noted that the concept of dynamically-composited workbooks defined using a SIDL is independent of the details of how the modules are created at run-time: A module implementation can alternatively be defined using, for example, XML rather than a software code-based approach.

Module Visual Formatting Definition

Advantageously, our system allows a user to design the appearance of the various spreadsheet objects, such as worksheets, separately from the implementation, and allows a visual format design to be efficiently re-used across multiple workbooks. This allows, for example, different visual styles to be designed for different spreadsheet application types.

The visual formatting of a spreadsheet module can be defined using the same Software Code/XML hybrid structure as used in the Implementation Definition: In this case the software code describes the appearance of the spreadsheet cells, rather than their contents. An illustrative example of a Module Format Definition (MFmtD) implemented using XML and software code is shown in FIG. 5.

The format definition is identified by the unique identifier FormatID 502 and, as in the implementation definition, the ModuleID 503 is also included. The software code section 505 illustrates two different ways to reference the cells: In 506 we use the cell addresses and in 507 we use the cell names. A preferred embodiment is the named approach of 507 since this obviously allows the formatting to be automatically linked to the functional cells.

Note, however, that there is no requirement to separate implementation and formatting in a module definition. We might require that an implementation definition and its associated formatting be always edited together. In such a scenario our system provides a means for tagging a formatting interface as being fixed to an implementation. This prevents the formatting interface being edited separately.

In another implementation, the formatting definition is constructed in a similar manner to Cascading Style Sheets (CSS) as used in HTML documents. The input cells can then be tagged with a particular style, and the output cells with a different style. Table headings, for example, can have yet another style associated with them. Formatted worksheets could then be easily designed and the application of the formatting style to the worksheet would be carried out automatically during the compositing of the workbook.

As already mentioned, the discussion so far has used worksheet-based modules to illustrate the essential aspects of our approach. For a software code module the notion of visual formatting obviously does not apply and this is another reason why specification of a format interface should be optional. To account for this, and to still have a common structure, our approach uses a Null identifier in a definition to signify that no formatting has been specified.

Constructing a Module Definition Instance

Figure 6:
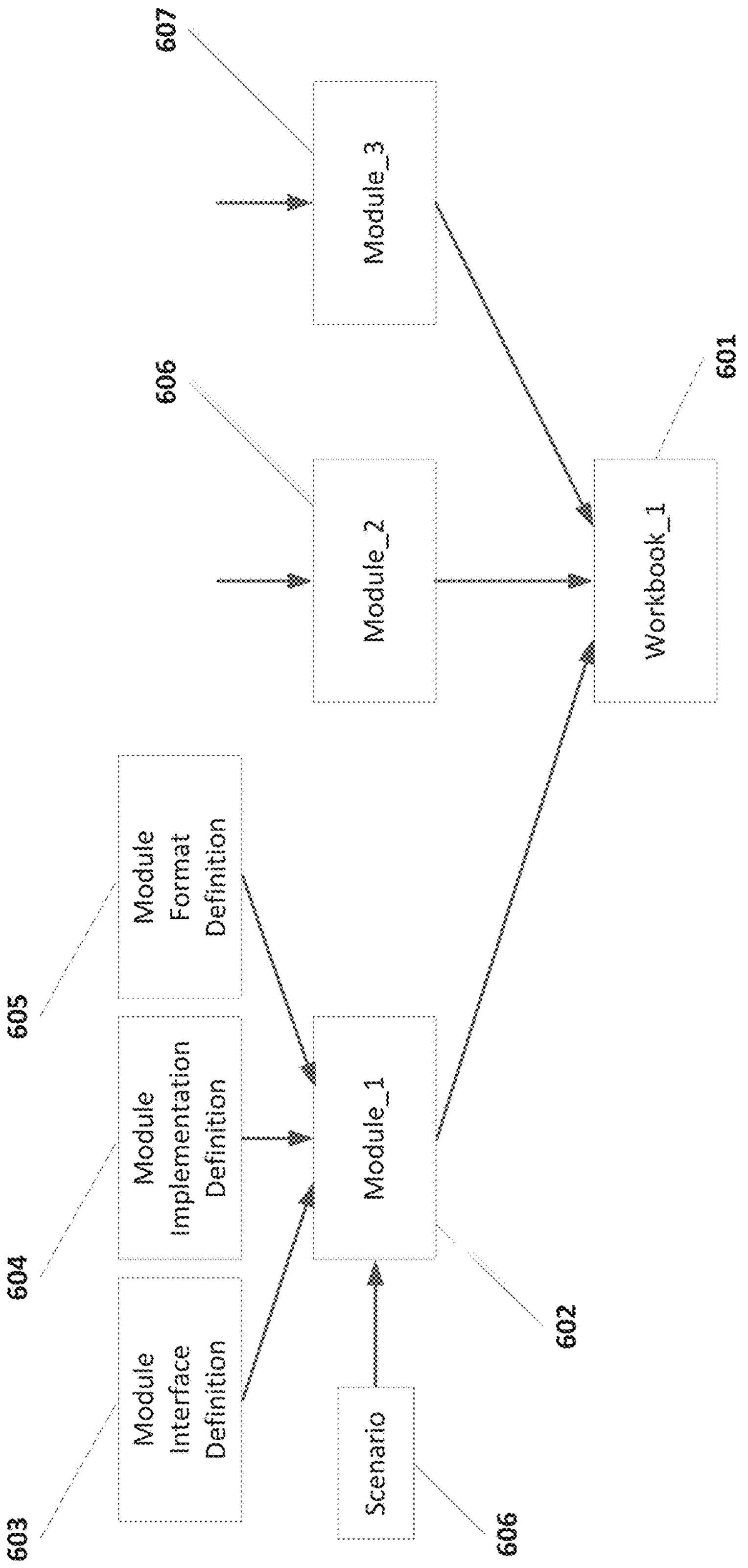
FIG. 6: High-level conceptual diagrammatic depiction of the components of a worksheet module instance (Module_1) and its involvement in the dynamic compositing of a multi-module workbook.

So far these teachings have described how the different elements required to construct a spreadsheet module, and the relationships between them, are defined. These relationships are illustrated in FIG. 6 for Module_1 602, which shows the interface definition 603, the implementation definition 604 and the formatting definition 605. For exemplary purposes, FIG. 6 also shows two additional modules 606/607 combined with Module_1 602 to create a composited workbook 601. The simplest spreadsheet workbook will contain a single module.

Our system allows the user to create an instance of a module (Module Definition Instance—MDI)—i.e. where the implementation and formatting have already been selected. This will involve the user first selecting the module interface definition, and then selecting the required associated implementation definition. Optionally, the user can then select a format. The components of this Module Definition Instance (MDI) are then stored in the repository for future retrieval.

An MDI list is one of the levels that would normally be browse-able on the network by end-users. In practice, the selection of the implementation would be restricted to an administrator or other high-level user: End-users would normally have no access at the implementation level.

In practice, a module instance will often be generated by parsing an existing spreadsheet workbook. This allows users to create modules from within their familiar spreadsheet environment, and will be discussed in detail at a later point in these teachings. In this case, the interface, implementation and formatting are all defined and linked at the same time.

FIG. 6 illustrates an additional element called a Scenario 606. A scenario is a set of defined input values for a module and there will normally be a default set of such values comprising the Default Scenario for the module. The concept of a default scenario is useful for testing modules in isolation.

Although the preferred embodiment of the present disclosure involves dynamic creation of spreadsheet modules from module definitions, the concept of an Interface described using a SIDL is also applicable to the situation where the spreadsheet module already exists in the form of a spreadsheet workbook file (i.e. document-centric mode). In this case the Interface Definition can be embedded into the spreadsheet workbook as a custom attribute (i.e. a section of text that is tagged and embedded into the structure of the spreadsheet workbook file).

Database Storage

Figure 7:
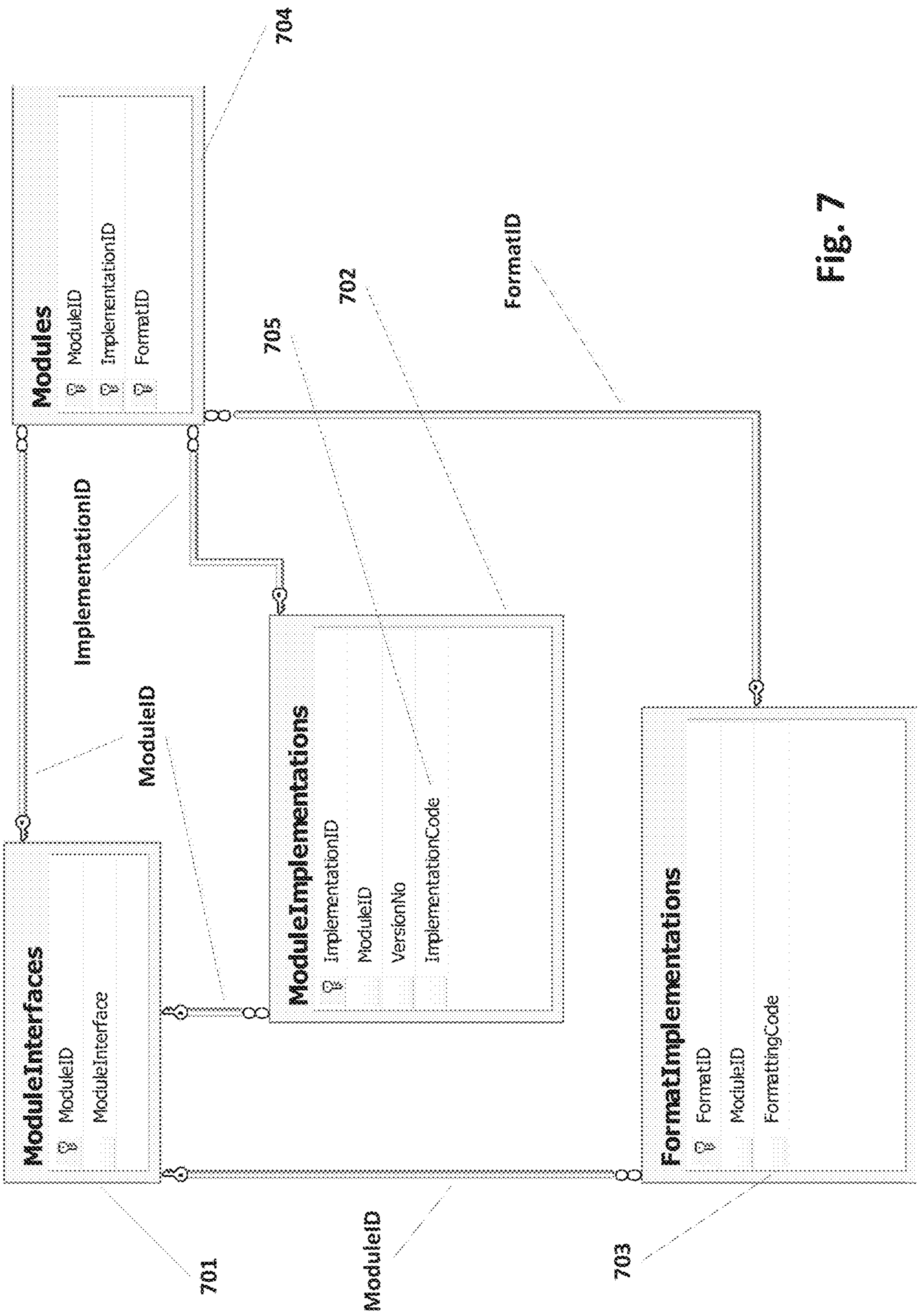
FIG. 7: Illustrative relational database sub-schema showing the relationships between the components of a worksheet module.

Another aspect of our approach is that all definitions are individually stored in some form of database. It is important to realise that there are a number of possible approaches to storing the definitions including, e.g., relational databases and so-called NoSQL databases. FIG. 7 illustrates one exemplary data structure, appropriate to a relational database, for the entities associated with modules.

There are four tables shown in FIG. 7 representing the module entities we have discussed so far: module interface definitions 701, implementation definitions 702, formatting definitions 703 and module instances 704. There are also several foreign keys defined in the diagram and these are labelled with the associated field name. The modules table 704 is the source of the browse-able list of modules that most power-users will access—i.e. those users who actually build the model and workbook definitions. When a module instance is defined in this table and made public on the network it is said to be published.

In the database design shown, the XML and software code used to generate the modules at runtime are stored in the database. For example, the ImplementationCode field 705 holds the software code that generates the spreadsheet object instance.

Advantageously, the use of software code in a module definition provides for the straightforward use of source code version control systems. In particular, it allows for the use of modern distributed version control systems (DVCS) such as Git or Mercurial. Distributed version control of XML-based files is problematic, but with our approach version control becomes straightforward since it is reduced to a problem of standard source code control. This in turn means that multiple users can be involved with editing module definitions without fear of causing code conflicts, and users can access the full power of modern DVCS systems for spreadsheet development.

An aspect of our system is that a source control system be combined with a module repository server to provide an integrated solution to module definition management.

Module Management User Interface

There are a number of ways in which a user-interface for constructing and managing modules can be implemented and for the purposes of illustration we describe two possible approaches. These embodiments should not be construed as being the sole ones possible, but are provided in order that this disclosure be thorough and complete, such that they fully convey the scope of the disclosure to those skilled in the art.

Figure 8:
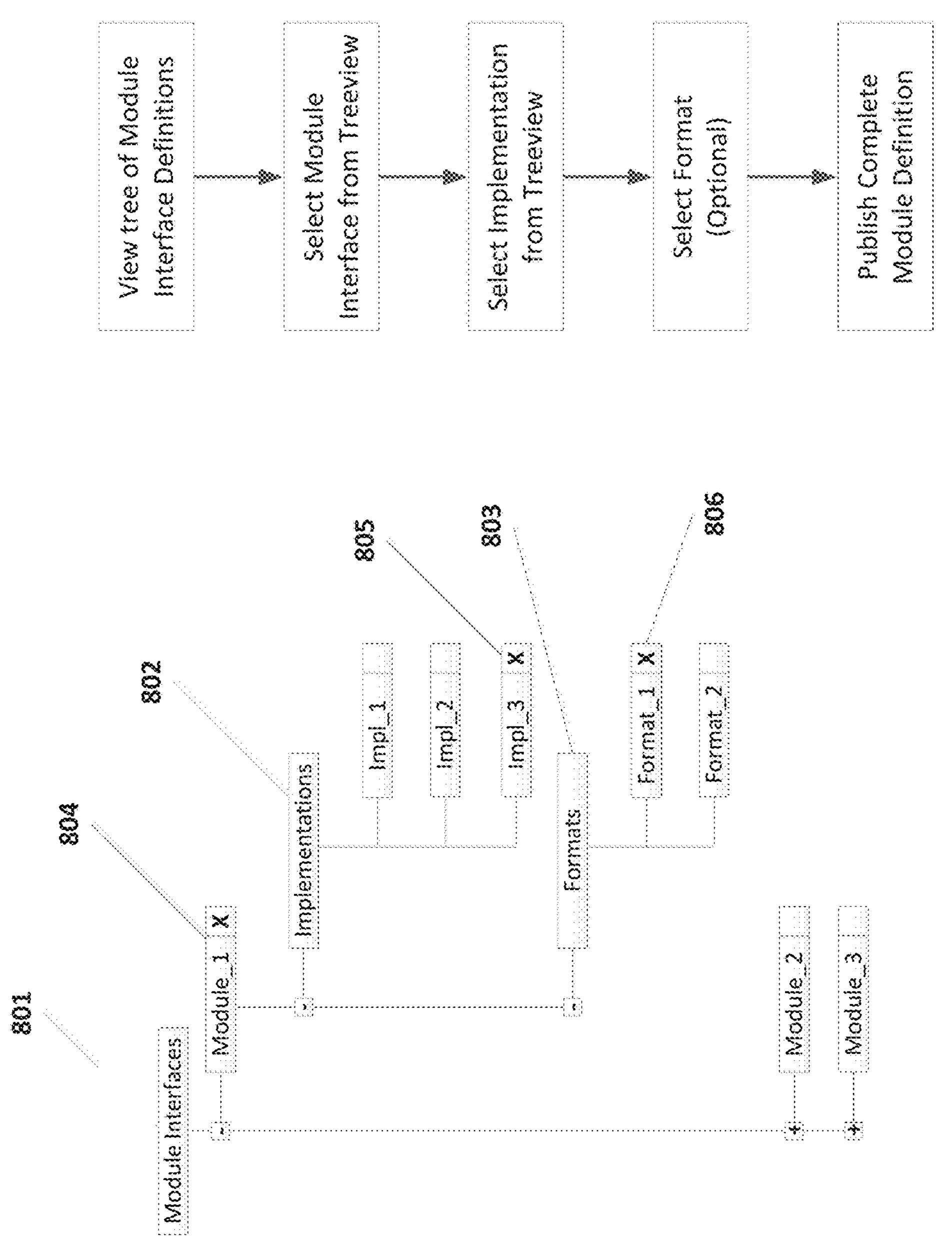
FIG. 8: Example tree view user interface for defining a worksheet module instance, with associated workflow.

From the relational database structure shown in FIG. 7 we can derive a tree-like user interface as shown in FIG. 8. The top nodes of the tree are the module interface definitions (MIntfD) 801, with the next level down holding the available implementation 802 and formatting 803 definitions available for each MIntfD node. In one embodiment, each node would have an associated checkbox that the user can select/deselect. In the example shown, the user has selected Module_1 804 as indicated by the checkbox. After selecting the module, the user has gone on to select Implementation_3 805 and Format_1 806.

FIG. 8 also illustrates an exemplary workflow for defining a module instance from such a treeview. The final step of the workflow is to publish the complete definition (i.e. the module definition instance) to the system.

In another embodiment, the user interface takes the form of a so-called "wizard", which presents a series of options to the user. The first page of the wizard would display the list of available module interface definitions from which the user would select one. Subsequent pages then allow the user to select the required implementation and (again optionally) a format definition, before finally publishing the complete module definition. The exemplary workflow of FIG. 8 is also appropriate to this wizard-style type of user interface.

Editing Module Definitions

After defining a module, there will normally be a requirement to edit it at some point afterwards. Our system provides a means of re-generating an implementation by embedding a Module Factory within the user's spreadsheet application. This can be achieved through the use of a dedicated spreadsheet application designed for such a purpose, or by extending the features of an existing spreadsheet application (e.g. Microsoft Excel) through a so-call Add-In or similar extension.

In a preferred embodiment, the system provides a user interface allowing the user to check a module definition out from a source control system associated with the module repository. After check-out, the module factory re-generates the spreadsheet module and inserts it into a temporary container workbook before displaying it to the user. This scheme allows the user to edit the module as they would any other spreadsheet. During the editing process the user will periodically save the changes and these will be stored locally, in one of the device's memory areas.

In a preferred embodiment the changes will be stored as a series of deltas, i.e. the changes after each save action. This allows simple rollback of edits. Finally, when all edits have been completed the user checks the module definition back into the source control system. Depending on the source control system used the changes will be stored as deltas or complete module definitions. In both cases the system user will have the ability to roll back to previous versions of the module definition.

Merging of Module Definitions: Models

The key concept in spreadsheets, and one that is familiar to those skilled in the art, is that of the model. A spreadsheet forms a particular implementation of a model, with input cells linked to output cells through a series of worksheet formulas and static data. The definition of a spreadsheet model in terms of specified inputs and outputs is standard practice and well known to those skilled in the art.

Within these teachings the concept of a model has a more specific meaning: It is a user-defined combination of modules and data flows that provides a highly flexible approach to building dynamically composited workbooks.

In order to create a complete spreadsheet workbook definition, the various module elements involved in a composited workbook must be merged into a single composite definition. Although the user can proceed directly from selecting and/or defining spreadsheet modules directly to merging said modules into a complete workbook definition, our approach allows for one more intermediate step: The definition of a Model. The simplest examples of models will typically comprise a single module.

Figure 9:
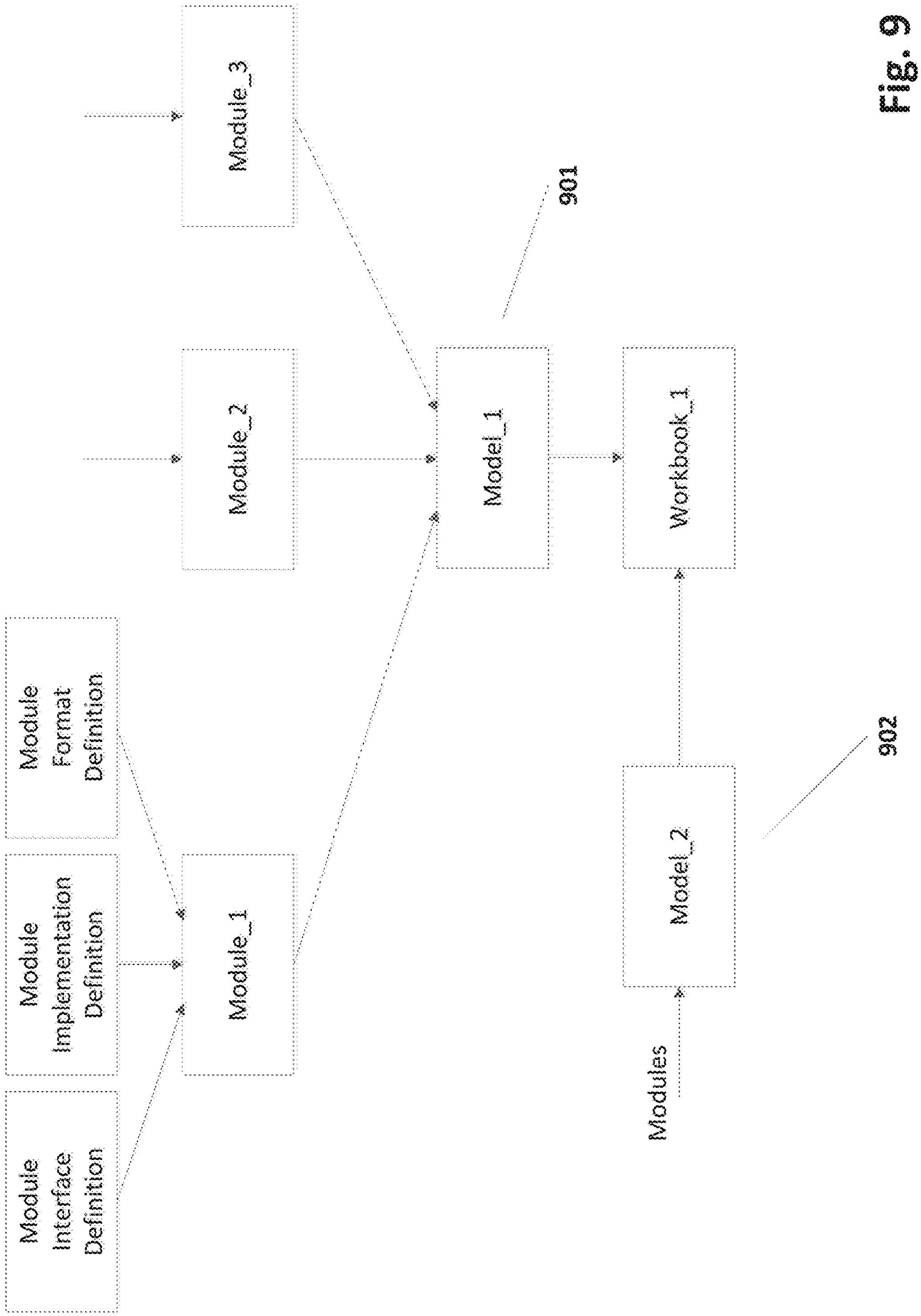
FIG. 9: High-level conceptual diagrammatic depiction of worksheet modules involved in the definition of two models and the subsequent dynamic compositing of a multi-model workbook.

Referring again to FIG. 2, we can see the hierarchy of Workbook—Models—Modules in the XML definition. This hierarchy is illustrated in a different way in FIG. 9, which incorporates all of the elements we have described thus far. Note that FIG. 9 is similar to FIG. 6, but with the former incorporating the Models level of the hierarchy. In FIG. 9, Model_1 901 and Model_2 902 have been pre-defined from existing modules: The workbook designer need only specify that Model_1 901 and Model_2 902 be included in their workbook definition and the system will automatically retrieve the required modules.

The incorporation of the "Model" layer into the hierarchy is designed to add additional flexibility into how modules are re-used. There will often be circumstances where a particular combination of modules is frequently used and by allowing these combinations to be specified and published independently, the system provides for workbooks to be built in the most efficient manner.

In addition, however, our approach provides a means of creating different model definitions from a single set of modules simply by changing the data flows amongst those modules. This use of DataFlow Mappings is described in detail at a later point in these teachings.

A workbook can be constructed directly from modules, without explicitly specifying a model: The simplest workbook definition incorporates only a single module. FIG. 6 illustrates the direct construction of a workbook from three existing modules, without the explicit involvement of a defined model. If a workbook definition is constructed directly with modules, the system inserts a default model name into the structure before passing it to the module factory. This ensures consistency of structure across all workbook definitions irrespective of the steps involved in their construction.

Advantageously, the system provides users with navigable lists of modules, models and workbooks. The visibility of these lists to the user will be determined by their permissions level: E.g. end users would normally only have access to the workbooks list and "power users" would have access to the module and model lists.

Module Inputs and Outputs

When merging multiple modules, one or more of the outputs of a module will map to one or more of the inputs of a following connected module. By default, module inputs have only a name defined initially (corresponding to a named range on a worksheet): The initial assumption is that the input value is manually entered. For an input of one worksheet module to be linked to the output of a different worksheet module we need to insert a formula into the named input cell or cell range.

Figure 10:
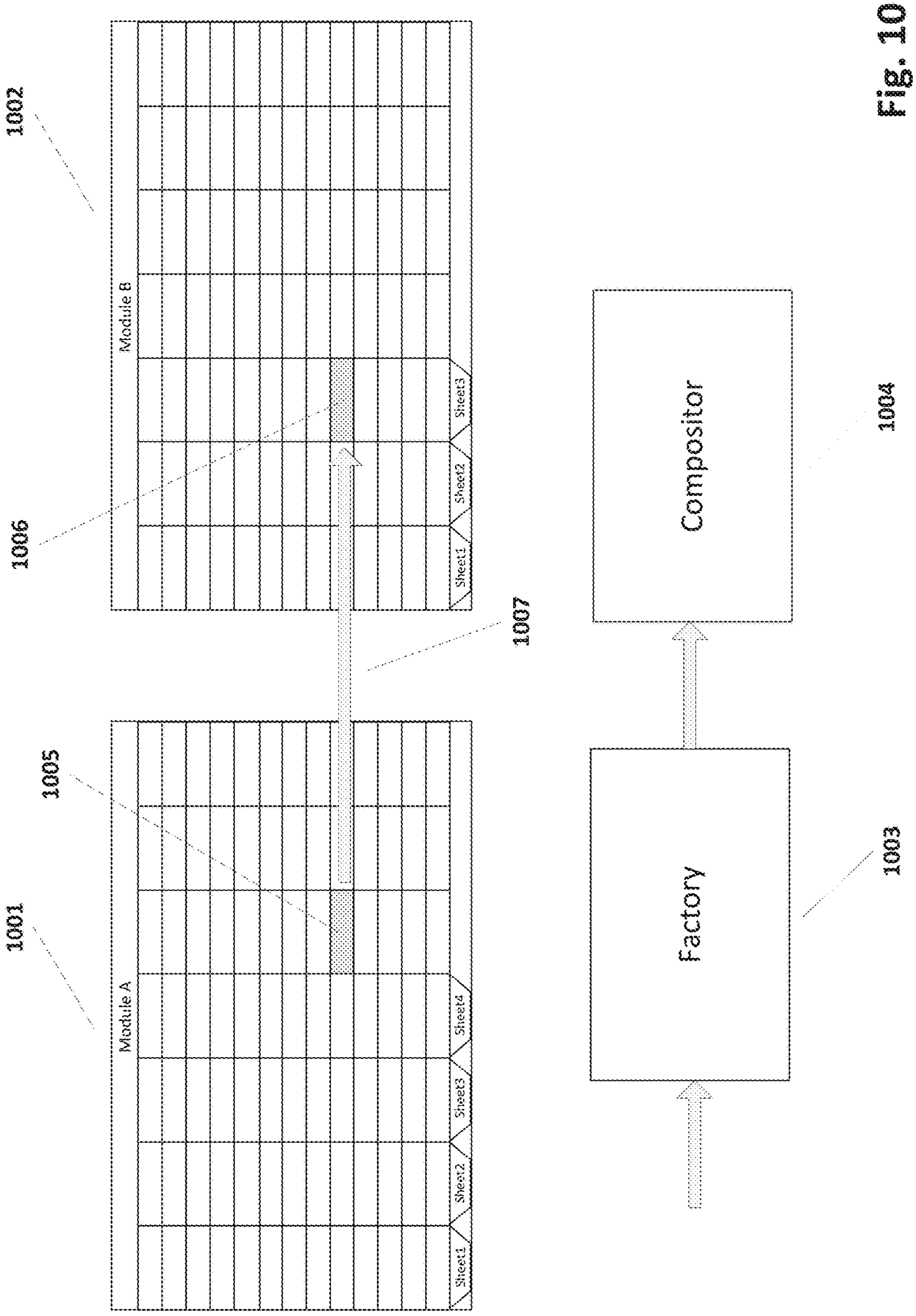
FIG. 10: Illustrative example of the mapping of a single output on a worksheet module to an input on a second worksheet module.

FIG. 10 provides an exemplary illustration of this using two worksheet modules, Module A 1001 and Module B 1002. In this example we assume that the two modules have just been created in the Module Factory 1003 and have now been passed to the Compositor 1004. For illustrative purposes we consider a simple single cell input/output combination.

Assume an output cell 1005 of Module A 1001 is named "Output1" and that it should be linked to an input cell 1006 named "Input2" in Module B 1002. At the point of module creation no relationship between the two modules has yet been implemented: This is one of the tasks of the Compositor 1004. In this example the Compositor 1004 will insert a formula into the named cell "Input2" 1006 which links it 1007 to the output cell 1005: Since the output cell 1005 is named "Output1" the formula is simply "=Output1" which is the standard spreadsheet formula for linking two cells. This dynamic linking is carried out at run time, without requiring user intervention.

By way of illustration we show an exemplary Model Interface Definition example in FIG. 11, with an XML-based dataflow mapping 1101 for the example in FIG. 10. Note that by default this DataFlow mapping is hidden (Visible=False). This is because internal linked inputs and outputs are assumed to be hidden from the user.

Not all module inputs and outputs will be linked in the manner illustrated by 1101 in FIG. 11: Some inputs will be so-called "User Inputs" (where the user manually enters a value) and some outputs will be "User Outputs" (where the user makes use of the value in some other way, rather than linking it to another cell or range). Note that the use of the term "User" does not necessarily imply manual data input: It simply specifies that the data values will be obtained in some other way specified by the user.

The DataFlow mapping 1102 illustrates an exemplary User Input. In this case there is no <Source> value specified and the <Destination> is Input1. This indicates to the system that it should not look for an output cell to link to Input1: Its value will be set by other means (e.g. manual input, data from a measuring device etc.). For user inputs it will often be useful to have a default value, and we see this indicated by the <DefaultValue> tag.

Similarly the DataFlow mapping 1103 illustrates an exemplary User Output that can be regarded as a Reporting Output. A Reporting Output is simply an output that will be used to report a value or as part of the input to a reporting element such as a chart. In other words it is not used as part of any further calculations. In the example 1103 there is no <Destination> value specified and the <Source> is Output2. Note that we have specified Visible=True for each of the mappings 1102, 1103: By setting Visible=False we can indicate that certain inputs and outputs should be hidden from the user, and the mapping 1104 is an example of such. In cases where we have hidden inputs then the <DefaultValue> tag becomes important.

By defining these DataFlow mappings we provide a means for the system to determine the complete set of inputs and outputs for the composite model. This set of inputs and outputs can then be used to define scenarios for the model.

Models Defined Through Data Flows

Figure 12:
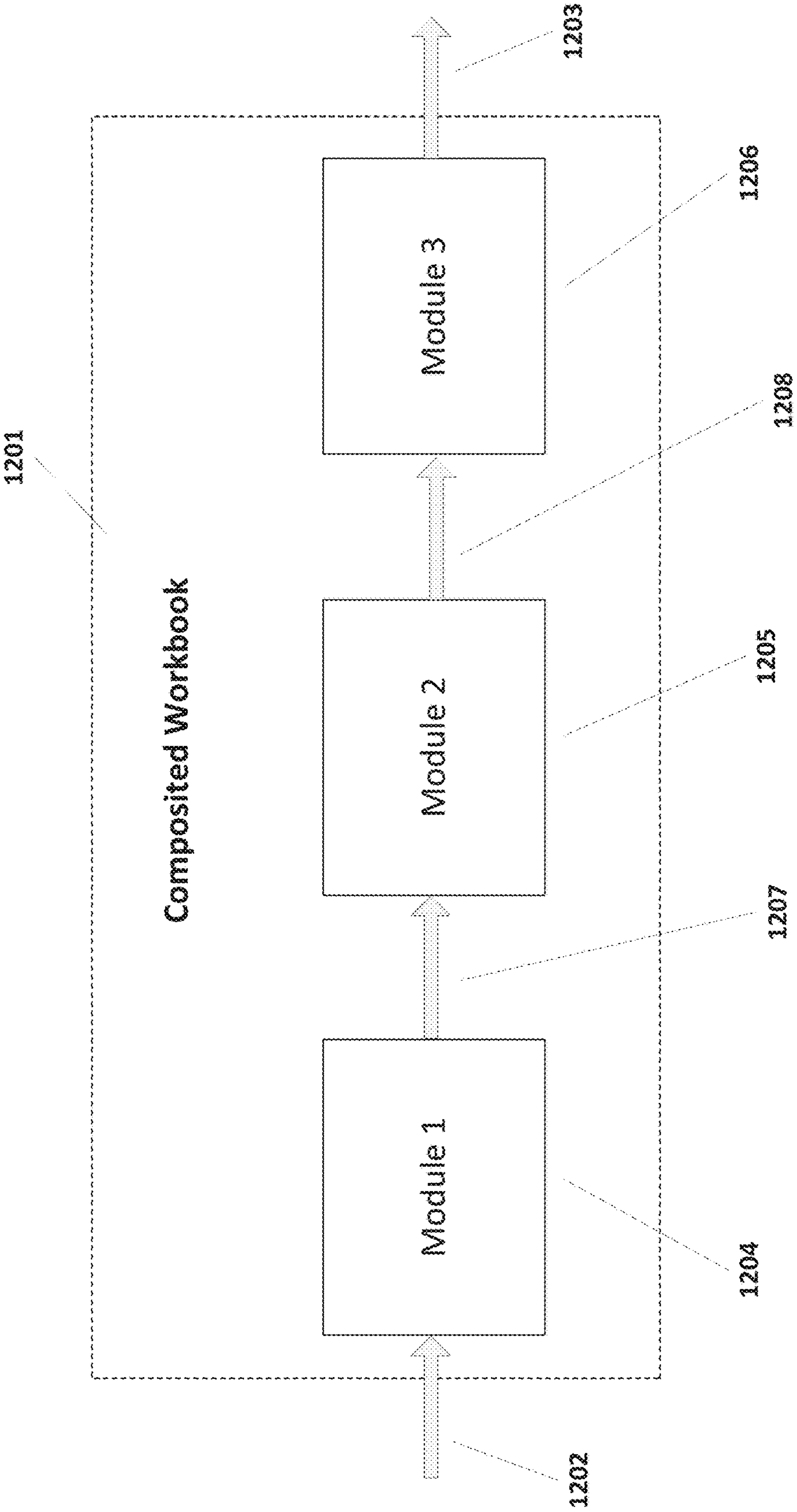
FIG. 12: An example of simple linear concatenation of three modules.

By defining a mapping for each input and output we can specify a mixture of behaviours for the various modules in a composited workbook or model. The simplest combination of modules comprises a linear chain with all of the user inputs associated with the first module in the chain, and all of the user outputs associated with the last module in the chain. This configuration is illustrated in FIG. 12 with a composited workbook 1201 built from three modules (1204, 1205, 1206). Here, the inputs 1202 for Module 1 1204 become the user inputs for the workbook 1201. Output/Input mappings 1207 and 1208 link the three modules. The outputs 1203 of Module 3 1206 become the outputs of the workbook 1201.

Figure 13:
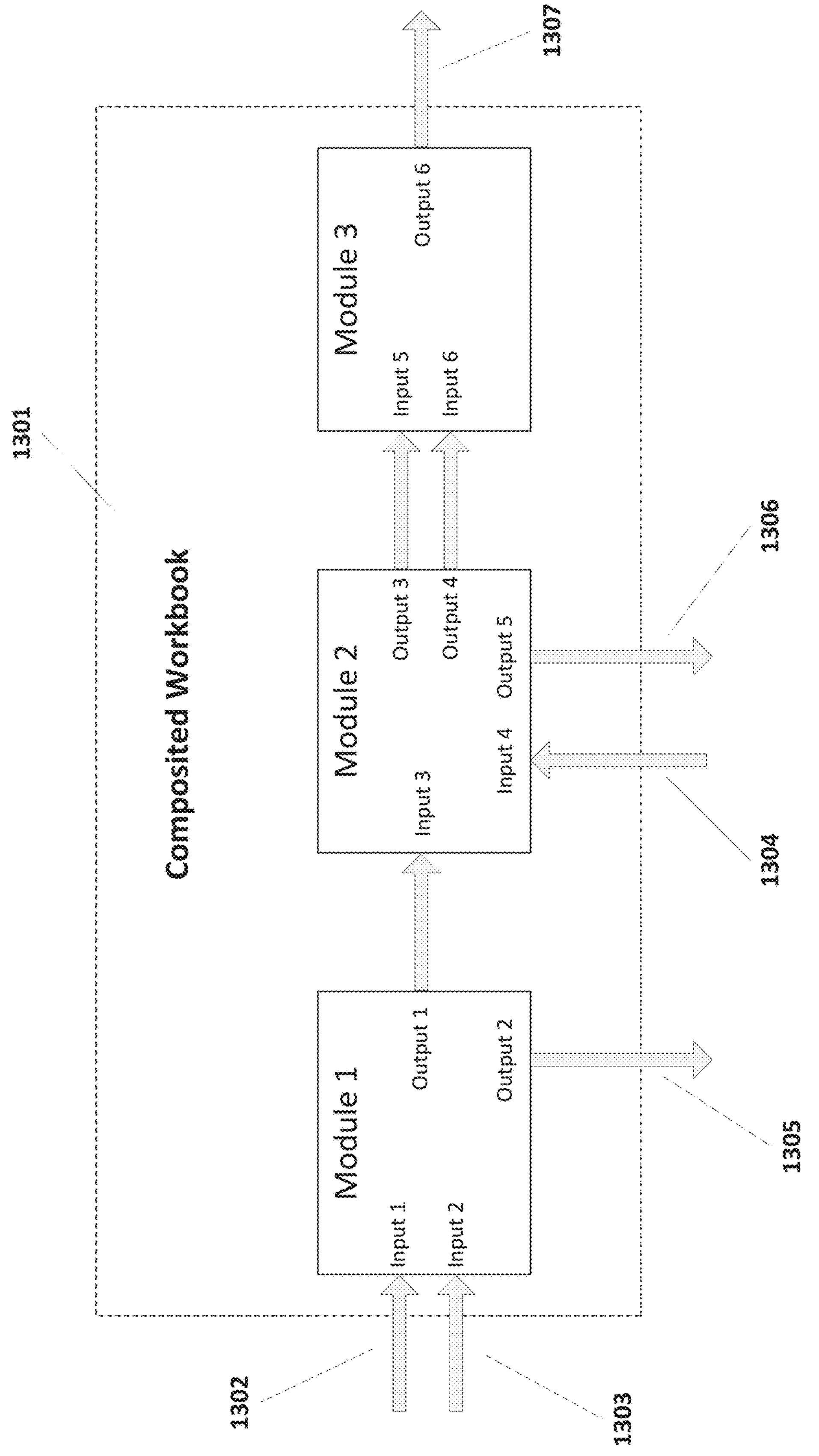
FIG. 13: An example of more complex concatenation of three modules where the overall behaviour is determined by the mappings used.

Advantageously, mappings can be used to alter the behaviour of the collection of modules in a number of ways. FIG. 13 provides an exemplary illustration of how multiple modules can be combined in a different configuration from the simple chain. In this example we can see that input and output points are located at intermediate points in the overall data flow. In this way we can define different models and composited workbooks based on the same set of modules, but configured differently. In FIG. 13 the user inputs for the composited workbook 1301 are Input1 1302, Input2 1303 and Input4 1304, and the user outputs are Output2 1305, Output5 1306 and Output6 1307.

Referring again to FIG. 11 we can see how these different inputs and outputs can be defined simply by how we populate the <Source> and <Destination> tags of the DataFlow mappings. Advantageously, our approach provides a much greater degree of flexibility than other approaches to defining model inputs and outputs that simply tag a cell (range) as an input or output cell (range).

At the core of our approach is the idea of a spreadsheet module as a functional entity with as narrow a functional scope as possible. In other words, a functional entity where we can define inputs and outputs without regard to any intermediate values that might require to be accessed by other users. If, when designing a model, a user encounters a situation where he or she requires access to an intermediate value in a module, then this is an indicator that the module should be decomposed into two or more modules with narrower functional scope. The input/output structure of a model built on said spreadsheet modules is then completely determined by the DataFlow mappings.

Software Code Modules

These teachings have so far focused on modules based on one or more cell-based spreadsheet worksheets, since these are the core entities comprising a spreadsheet workbook. The underlying functionality of a spreadsheet is based on worksheet functions, and modern spreadsheet applications provide a wide range of in-built standard functions. In practice there are many situations where the in-built functions require to be augmented with custom worksheet functions. Advantageously, our SIDL-based approach allows a wide range of different types of modules to be defined and incorporated into a workbook, including software code modules. We now consider how these can be defined within the context of our system.

The use of software code to create custom functions in spreadsheets is well known to those skilled in the art. For example, Microsoft Excel provides two mechanisms for creating such custom functions (i) software code embedded within the spreadsheet workbook and executed as a script, e.g. using Visual Basic for Applications (VBA) or (ii) software code that is compiled into an external library using an external compiler tool. In broad terms, a script is a piece of software code that is interpreted at runtime by the host application, and compiled software code is a set of binary instructions that is executed at a lower level. In real-world systems compiled code is generally significantly faster in execution than script-based code, making the former the preferred choice in high-performance systems.

Although worksheet functions defined by custom scripts (such as Microsoft Excel VBA scripts) can be made available to other spreadsheet workbooks by linking to the workbook that contains the script, the same problems already discussed regarding linked workbooks also apply. Combined with their relatively poor performance this limits their applicability: For example, they are not regarded as being suitable for spreadsheet service architectures. The primary advantage of VBA scripts, however, is that they are often created by spreadsheet "power users" who are not necessarily professional software programmers. Compiled external libraries on the other hand are created by professional programmers using sophisticated external software development tools.

As already mentioned, an important aspect of our approach is to provide a system that allows spreadsheet power-users to build sophisticated user-defined applications. This philosophy extends to the creation and management of software code modules. Our system includes a software code editor that allows a user to create custom functions within software code modules using different programming languages. The system also comprises an embedded software compiler with the ability to combine these (multi-language) code modules into a single function library. This function library exports the functions defined by the user and is dynamically linked to the spreadsheet engine after the library's creation, allowing the functions to be immediately used within any worksheet.

By having a software compiler embedded within the system, the software code modules defining custom worksheet functions can be dynamically retrieved from the module repository and compiled according to the requirements of the module definitions used for the workbook. Note that the embedded compiler approach described here is not restricted to use with dynamically composited workbooks: An embedded compiler also has great value in the document-centric approach, allowing users to easily build compiled libraries of worksheet functions. An embedded compiler can be provided independently of the dynamic generation of a spreadsheet workbook at runtime. That is, it can be provided whether a workbook is dynamically generated at runtime or not.

Figure 14:
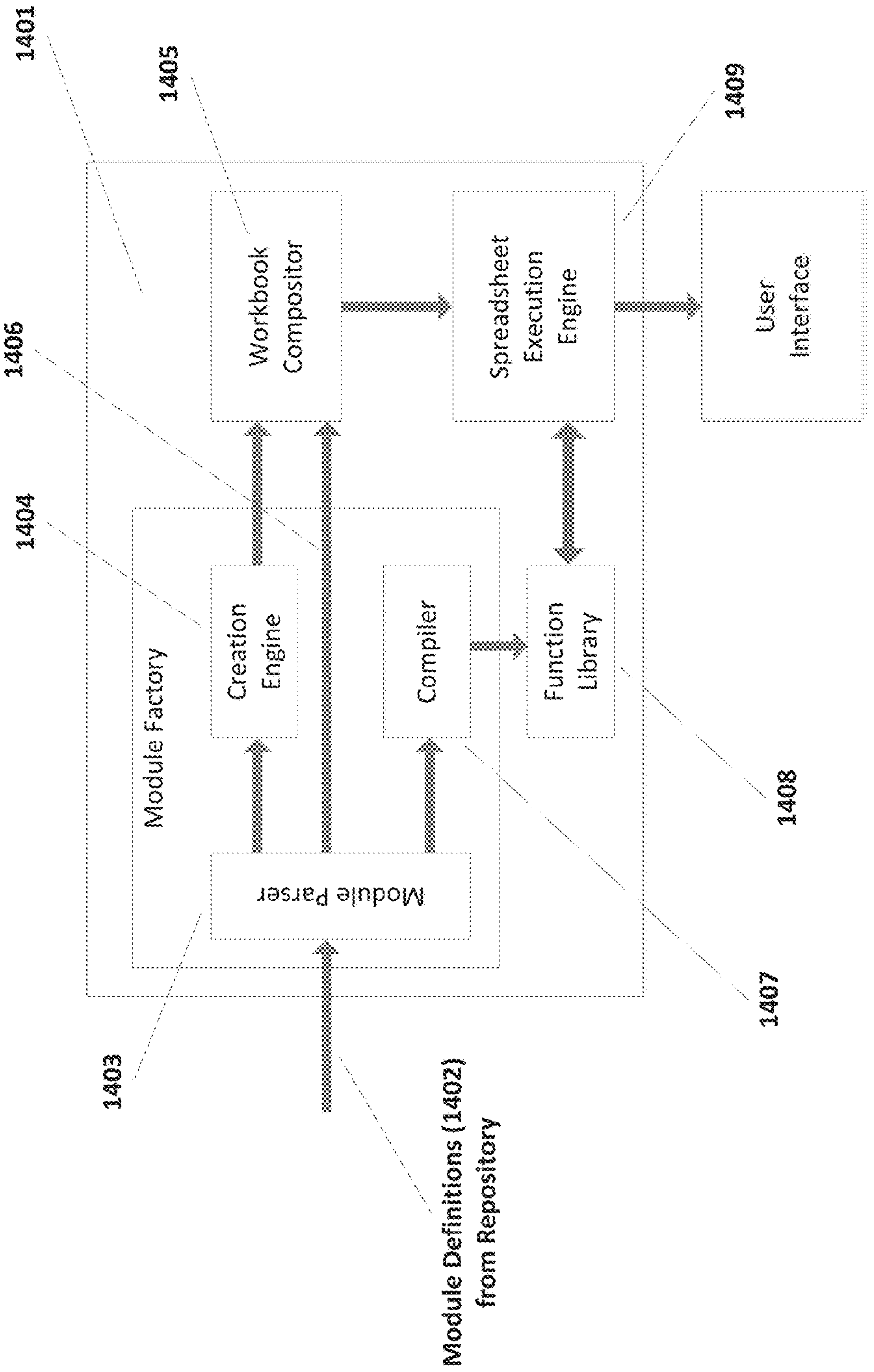
FIG. 14: A high-level schematic showing the relationships between the various elements involved in constructing a dynamically composited workbook.

A high-level schematic showing the relationships between the various elements, and the role of code modules, is shown in FIG. 14. In this diagram we assume all of the elements of the system 1401 reside on a single device. The required module definitions 1402 of different types are retrieved from one or more repositories and passed to the module parser 1403. Spreadsheet module definitions are then passed to the creation engine 1404 where they are re-constructed as one or more worksheet objects before then being passed to the Workbook Compositor 1405. For illustration purposes we also show the route 1406 taken by modules that do not require to be re-constructed: An example of such a module (Static Data Module) will be discussed in more detail below.

Software code modules are passed to the compiler 1407 and transformed into compiled code libraries 1408 that export the user-defined functions. In a preferred embodiment, the code libraries are then dynamically linked to the spreadsheet execution engine 1409, from where they can be accessed by the worksheets. There are different ways in which the exported functions can be made available to the spreadsheet engine. In one embodiment the library exports one or more function objects or, preferably, interfaces. Each object or interface provides methods and properties for calling the function and retrieving the calculated values. The calculated values are then inserted into the worksheet by the spreadsheet engine. In a second embodiment the function receives the input values and a reference to the destination worksheets for the calculated values: The function is then responsible for inserting the calculated values in the worksheet (i.e. by using a so-called "call-back" method).

By dynamically building custom function libraries at runtime, the system ensures that only the functionality required by the workbook is loaded. This has important implications for system load within a spreadsheet services architecture, and allows such systems to have greater scalability. This approach also allows flexibility in specifying which libraries are shared and which are dedicated to a particular workbook. The system can intelligently analyse the usage of different library functions at runtime and re-configure the different functions across different libraries as required.

Function libraries can be operated in pools and heavily-used functions can be provided from a larger pool. The assignment of different libraries and pools to different cores of the device's processor can also be dynamically managed.

Advantageously, our approach also allows for a specific type of worksheet module, where all processing is carried out by custom software libraries and the worksheet simply acts as an input and output harness. In conjunction with networked modules, this then allows spreadsheet users to create powerful computation nodes that can act as components of a distributed computing system.

Static Data Modules

These teachings have so far focused on describing module types that are dynamically created at runtime from module definitions retrieved from one or more repositories. Our approach also allows for a dynamically composited workbook to be built from worksheet objects extracted from spreadsheet workbooks, or from a combination of such worksheet objects and module definitions. The latter (combination) scenario has already been illustrated in FIG. 14.

One module type that lends itself to such an implementation is static data—i.e. where we have one or more worksheets where the data never, or at worst rarely, changes. In such a case it can make more sense to use a worksheet in its standard format, rather than convert it to an implementation script. The advantages of an implementation script, e.g. simplified differencing for change detection, are less likely to apply to static data.

An example of where this type of module will be applicable is in the creation of a module of standard constants: For example, number of days in a year, days in a week etc. These constants can be assigned to standard named cells (e.g. "Days_In_Week") and used throughout all worksheet modules. This type of standardization and control will lead to spreadsheet implementations that are less prone to errors. (The specification of external dependencies in a module interface definition has been illustrated in FIG. 3 and are indicated by the <Dependencies> tag 306).

As with the previously discussed module definitions, modules based on spreadsheet worksheet objects will also require to have associated information, such as the ModuleID. In practice a worksheet object will always reside within a workbook container. In a preferred embodiment, the properties associated with worksheet object modules are stored within the container workbook as a custom attribute (in the form of XML or similar).

Figure 15:
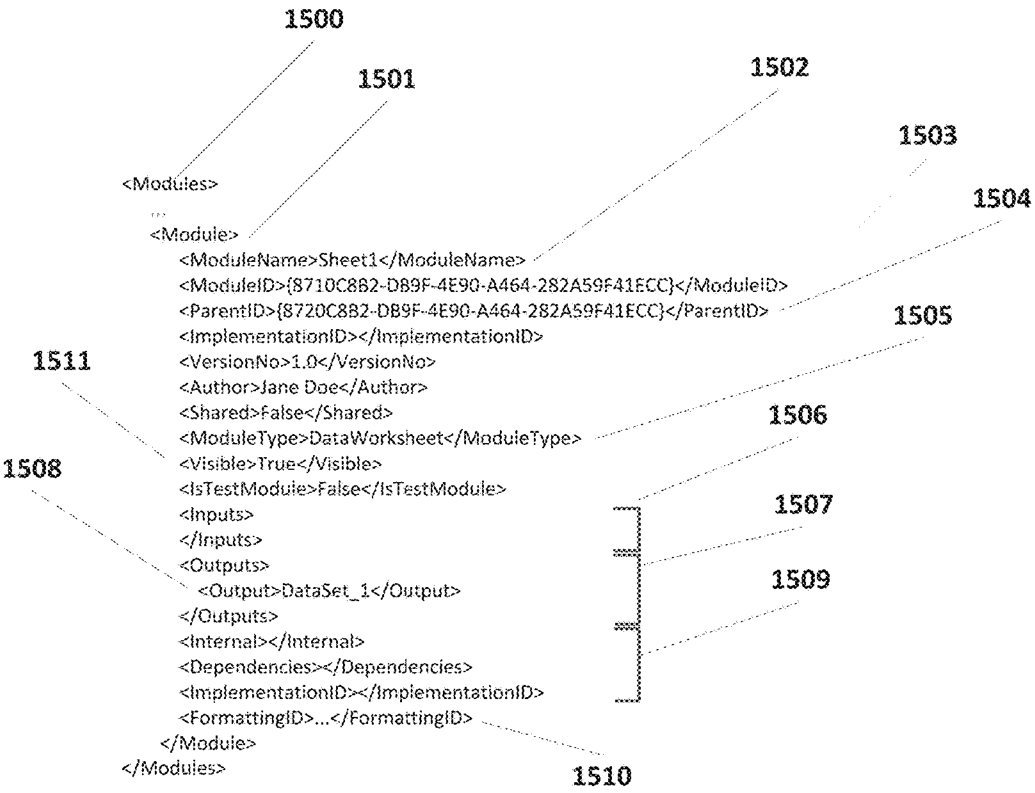
FIG. 15: An example of a Static Data Module definition in XML.

An example of a Static Data Module definition in XML is shown in FIG. 15. This complete definition 1501 is stored as part of a <Modules> attribute 1500 in the parent workbook. For consistency of processing, the same structure is used for the definition as in the module interfaces discussed earlier (e.g. FIG. 3) and any tags that are not relevant are simply left empty. The preferred embodiment for a static data module is for it to involve a single worksheet: Multiple data worksheets should be split into separate data modules. In the definition 1501 the module name 1502 is simply the worksheet name and the ModuleID 1503 is used as previously.

The ParentID 1504 refers to the system identifier used for the container (parent) workbook. Spreadsheet workbooks that are used in the system are subject to document control, and as part of that control each workbook is assigned a unique identifier. This identifier (and other properties involved in the control) is itself stored as a separate attribute within the workbook, and is also stored in the document control database. By using this approach, a single container workbook can hold multiple data modules, as is indicated by the <Modules> tag 1500.

The ModuleType tag 1505 allows the system to determine how to handle the different properties within the definition. Note that the use of a text-based property in 1505 is for illustration purposes and the type used will depend on the details of the system implementation: E.g. an integer property could also be used.

For a Static Data Module there will be no inputs and hence the <Inputs> 1506 are left empty. The <Outputs> tag 1507 is used to define the physical location of the data. In this example we have an output DataSet_1 1508 which maps to a named range on the worksheet ("Sheet1") that contains the actual data.

Remaining tags that are not relevant are left blank 1509, although the format tag 1510 will still be relevant if the module is marked as "Visible" 1511.

Dynamic Data Modules

As well as Static Data Modules, our approach allows for the straightforward definition of Dynamic Data Modules—i.e. where the data is retrieved dynamically at run time from a source external to the system. Examples of such data sources include, but are not limited to, relation databases, NoSQL databases, flat files and streaming data sources.

FIG. 16 (*a*) illustrates an exemplary XML-based definition for a Dynamic Data Module, which we can see follows the same structure as the other module types we have discussed. In this example the module type 1603 is DynamicData, and there is in addition an ImplementationID 1605 referenced. As with the Static Data Module (SDM), the module name 1602 determines the worksheet name that contains the data. In contrast, however, the worksheet object does not exist since we have only a module definition: The worksheet is created at runtime by the module factory.

Again as in the SDM definition, the output 1604 indicates the named range that contains the data on the worksheet. This named range is also created at runtime. It is important to note that since the size of the dataset is not known beforehand, the system creates a so-called "Dynamic Named Range", which expands in size according to the size of the dataset. The steps involved in the creation of Dynamic Named Ranges in spreadsheets is known to those skilled in the art.

The ImplementationID 1605 links to an implementation definition in a similar manner to that described for worksheet modules, and an exemplary definition is shown in FIG. 16 (*b*). In this example we show an implementation for a relational database, with SQL code 1606 in the <Code> section. The implementation definition does not, however, hold information on the location of the data: This must be held in a separate definition. For this, our approach easily allows the definition of a data source, and an exemplary definition (for a relational database server) is shown in FIG. 16 (*c*). By separating the different definitions in this way we can obviously use the data source definition with multiple implementations. Also note that in this example we reference the data source definition ID 1608 in the <Input> tag 1607 of the module definition 1601. This is a convenient way to define the data source for this exemplary definition: There are a number of ways in which this could be achieved, however, including a specific <Datasource> tag.

Sequential Data Modules

Advantageously, our approach allows us to define a Sequential Data Module (SDM) type, where the data is retrieved dynamically only when it is required for calculations, and is afterwards immediately dispensed with. This type of data module has application in areas where data sets are extremely large—often too large to be loaded into the available memory of a computing device. Such data modules are ideal for use with analysis methods designed for very large data sets, e.g. Sequential Principal Components Analysis.

In a sequential data module the data is retrieved in "chunks" the size of which can be specified by the user, e.g. through a <DataSize> tag in the data module definition. Note that our approach allows the definition of an SDM in a simple manner: An <IsSequential> (or similar) tag is added to any of the data module definitions (Static or Dynamic) previously discussed.

In-Memory Linked Workbooks

Earlier in these teachings we have highlighted the disadvantages of linked workbooks as normally implemented in the document-centric approach. Advantageously, our approach allows us to introduce additional flexibility through the construction of dynamically-composited in-memory linked workbooks, which avoid the disadvantages of their document-centric equivalent.

Figure 17:
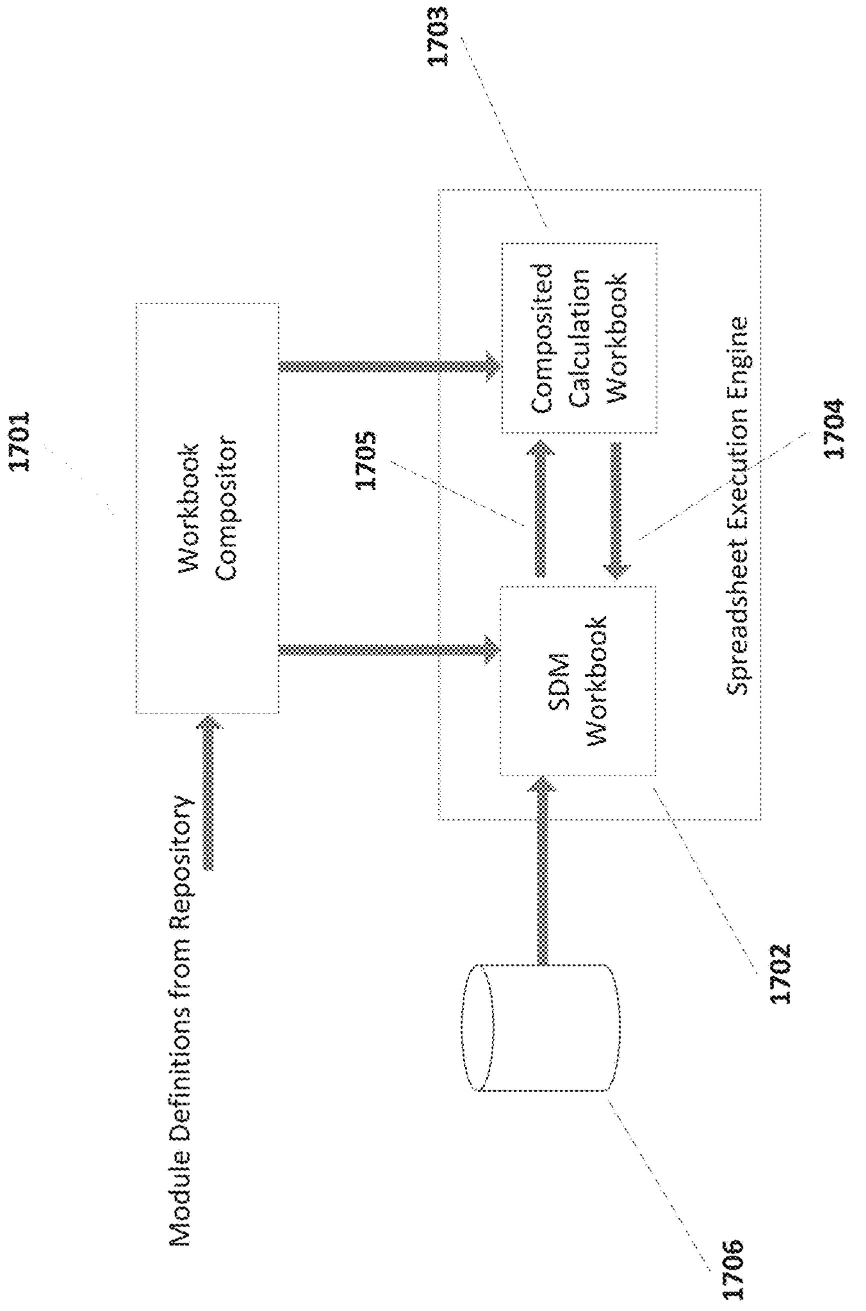
FIG. 17: An example of dynamically-composited in-memory linked workbooks involving a sequential data module (SDM).

To illustrate the use of in-memory linked workbooks we consider an example involving a sequential data module (SDM). An exemplary high-level schematic illustrating an SDM operating in the context of linked workbooks is shown in FIG. 17. In this example the workbook compositor 1701 receives the module definitions from the repository and creates two workbooks: An SDM workbook 1702 and a calculation workbook 1703. The two workbooks are linked: The calculation workbook 1703 requests data 1704 and this is then supplied 1705 by the SDM 1702 after retrieval from the data source 1706.

This use of in-memory linked workbooks can be extended to multi-core processor architectures to provide a form of load-balancing. For example, in a multi-core system one core might be dedicated to handling the sequential data module, with the remaining cores being used to host calculation-intensive in-memory workbooks. Since data retrieval is often a bottleneck in data processing systems, this approach would ensure that the optimum use of computing resources could be achieved. We stress that this multi-core linked workbook architecture is not restricted to use with SDMs: It can be applied to any combination of modules.

Parsing a Spreadsheet Workbook

A key feature of our system is the ability to parse existing spreadsheet workbooks and extract modules corresponding to the spreadsheet objects comprising a workbook. This provides the simplest means of creating a module since the user can work in their familiar spreadsheet application before converting their workbooks to modules. This also allows the user to exploit existing spreadsheet workbooks rather than having to create all modules from scratch. When designing a spreadsheet module from scratch the user can more easily ensure that the module is narrow in functional scope.

Advantageously, the use of software code as described above to define both the implementation and formatting definitions allows for their simplified separation. A code parser that identifies which lines of code are related to formatting, and which are related to content, is relatively straightforward to build once the workbook has been converted to a code-based form. The details of how such code parsing would be carried out are well known to those skilled in the art and will not be described here.

The parsing system makes use of named ranges to separate dataset modules from other implementation code. For example, if there exists a two-dimensional array of values in a worksheet, these should be incorporated into a named range. The auto-parser then treats the array as a dataset module, rather than create a block of software code that populates individual cells within the implementation section. The user also has the option of specifying a source for the dataset: For example, a relational database in a Dynamic Data Module. Note that the use of named ranges is critical to parsing a workbook. The use of cell-based references for any module or interface definitions would be completely impractical.

Note that before parsing, the user must build the module interface definition(s), and this is normally done in conjunction with the workbook. At its most basic, an interface definition will comprise an input and an output, and the user can associate these with named cells or ranges in the workbook.

When creating a workbook specifically for defining a module, it is good design practice to ensure only one module per workbook. However, in legacy workbooks there will usually be multiple modules incorporated into its structure. By its very nature, the parsing of a workbook will be a user-guided process: Only the user can specify the relationships between the parsed elements and the elements specified in the interface definition.

An important feature of a spreadsheet workbook parser is the ability to extract any custom scripts (such as, e.g., Microsoft Excel VBA) into software code modules. In our approach the parsing of such scripts is also semi-automated, with user intervention being required in order to specify the inputs and outputs for the resulting module definition.

Creating Merged Definitions

For the purposes of illustration we now describe two possible user interfaces (UI) for creating a composited definition, built from one or more module definitions. These UI embodiments should not be construed as being the sole ones possible, but are provided in order that this disclosure be thorough and complete, such that they fully convey the scope of the disclosure to those skilled in the art.

The simplest method for merging the different module definitions is for the user to carry it out manually using a text editor. An additional example embodiment involves the use of a Flow Diagram User Interface (FDUI), of the type that can be created by diagramming tools such as Microsoft Visio (for example).

Figure 18:
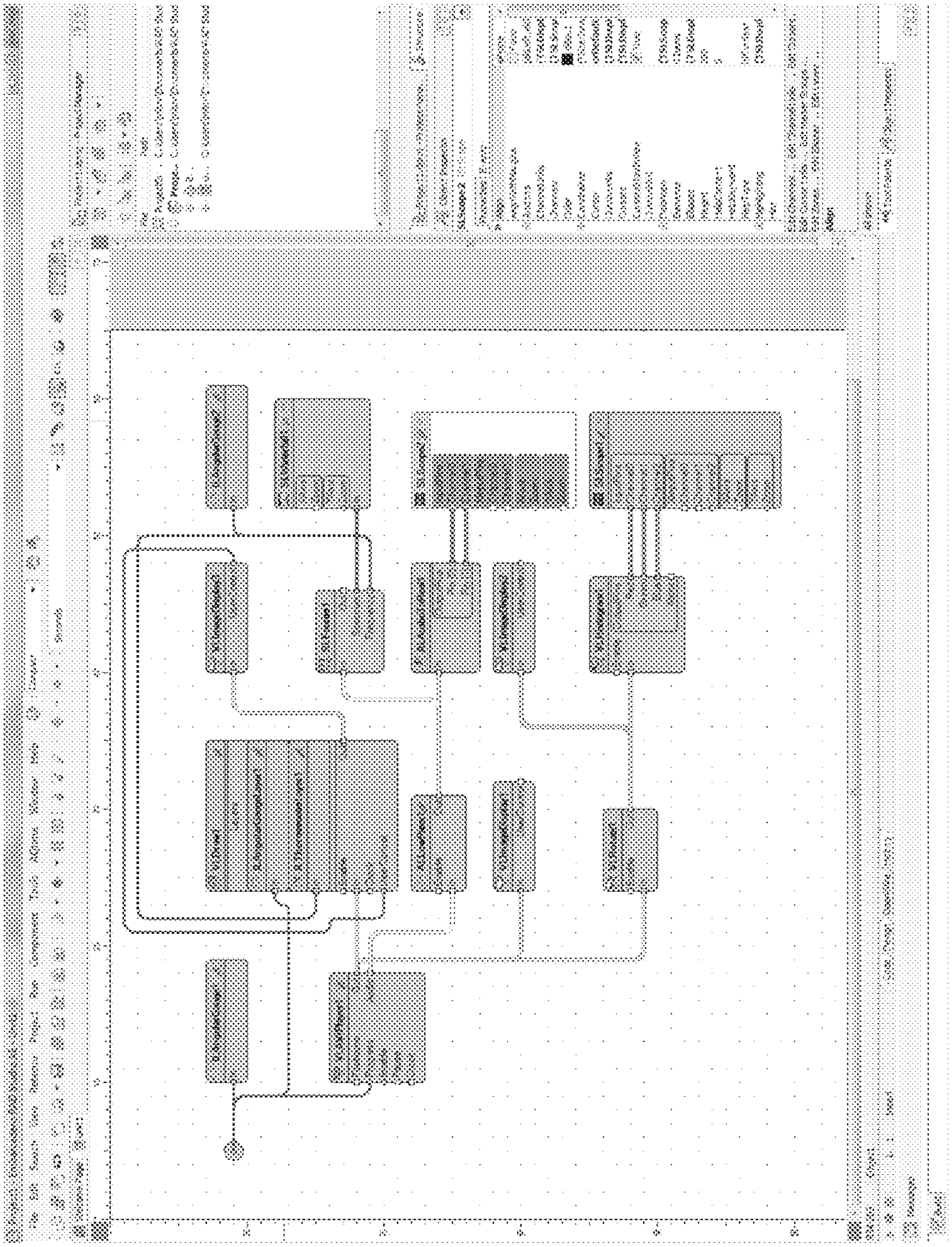
FIG. 18: Example of a flow-diagram user interface of a type that can be used to define input/output mappings between modules.

FIG. 18 illustrates an exemplary depiction of such an interface. Such an FDUI could be implemented as an add-in to an existing flow diagramming software application (e.g. Microsoft Visio) or as an integrated part of the software system designed for creating and managing module and workbook interface definitions. Such flow-diagram based software application designers are well known to those skilled in the art.

The FDUI is used to (a) select which modules to include in the composited workbook and (b) connect module outputs and inputs. The linking of outputs and inputs is defined via DataFlow mappings, as discussed earlier.

User Interface Modules

Another powerful feature of our approach allows the functional modules of the composited workbook to be kept hidden from the user with all interaction with the composited workbook carried out through user interface modules.

Thin-Client User Interface

Advantageously, our system provides for the creation of a so-called "thin-client" user interface. In a preferred implementation of this architecture the thin-client is created by defining one or more spreadsheet user-interface modules (UIM) that "mirror" the inputs and outputs specified by the user. In a preferred embodiment, this mirroring is implemented by mapping the equivalent ranges on the IUM and in the dynamically composited workbook by convention. "By Convention" is meant that they are mapped according to name: e.g. an input cell "Input1" in the UI module will be mapped to an input cell "Input1" in the dynamically composited workbook.

When an input value is dispatched from a UI workbook (dynamically composited from one or more UI modules) the name of the source named range is also dispatched. Upon receipt at the remote workbook the system searches for a corresponding named range and, if it finds one, inserts the input value. The same process in reverse applies for output values generated by the remote workbook.

Figure 19:
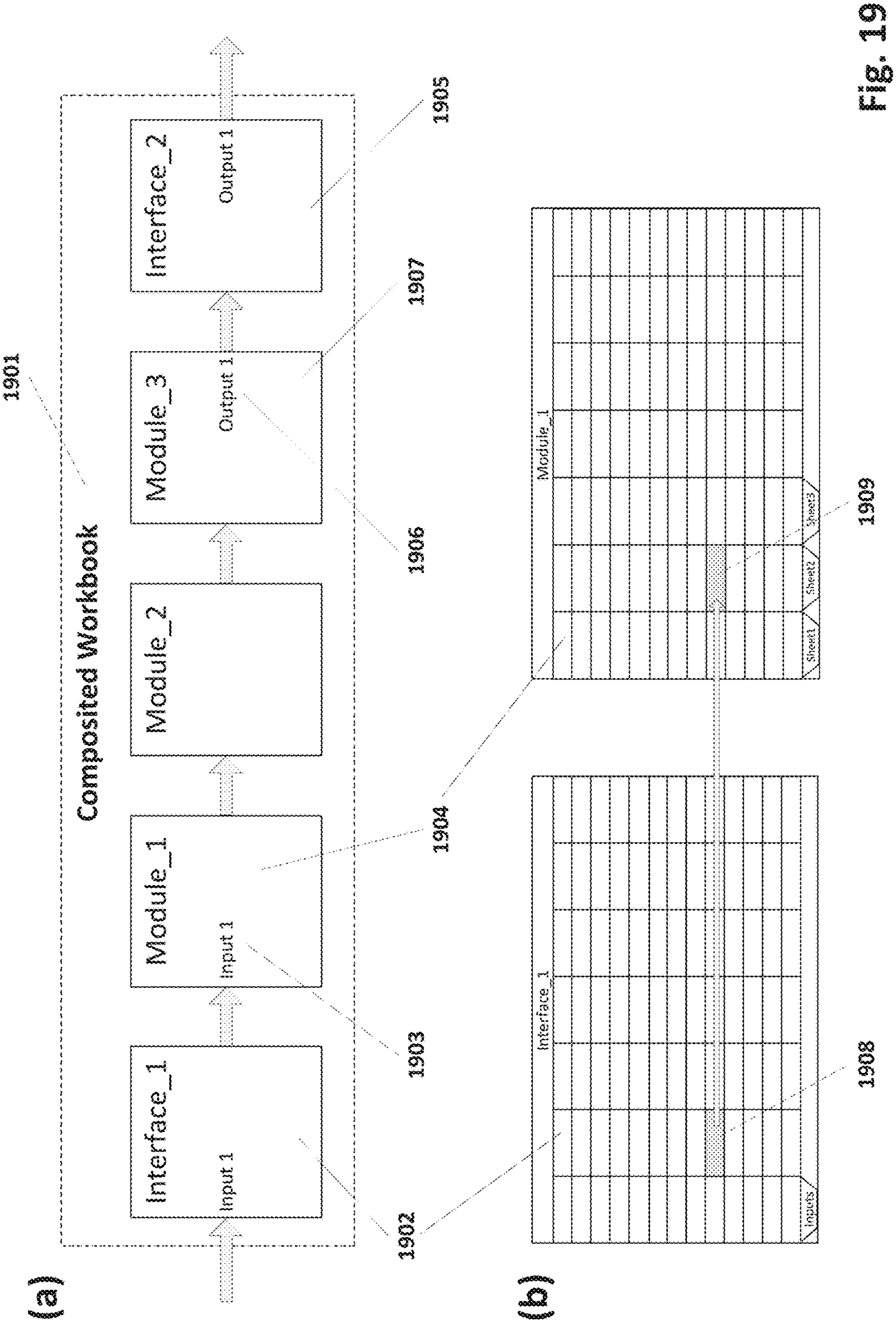
FIG. 19: Illustration of a thin-client module implementation.

FIG. 19 extends the exemplary linear model that we saw earlier in FIG. 12. In this case we have two additional spreadsheet modules in FIG. 19 (*a*): Interface_1 1902 which mirrors Input1 1903 on Module_1 1904 and Interface_2 1905 that mirrors Output1 1906 in Module_3 1907.

Advantageously, a key feature of our approach is the automatic generation of such spreadsheet user-interface modules directly from the interface definitions, simply by specifying the appropriate DataFlow mappings. In the workbook definition of FIG. 2 we observe a <CreateUIModules> tag and this controls whether or not such modules are auto-created at runtime. This again demonstrates the flexibility and power of combining an Interface Definition Language with data mappings.

Note that in this particular embodiment the interface modules do not have to be explicitly defined by the user when designing the workbook. It should be noted that other embodiments wherein the user does define them at design time, rather than using a default auto-create, are also implicit in these teachings. As with other spreadsheet modules a separate formatting implementation can be applied to interface modules.

Referring to FIG. 19 (*b*) we have an exemplary illustration of the two spreadsheet modules Interface_1 1902 and Module_1 1904 showing the linked cells. The workflow for creating the user-interface modules would be as follows:

- System reads value of <CreateUIModules> tag in the workbook definition
- If CreateUIModules=True system creates two new spreadsheet modules with sheet-level named cells (e.g. "Inputs!Input1" in cell 1908)
- System adds new DataFlow mappings linking the interface modules to the modules associated with each input and output
- System inserts new module definitions into the workbook definition
- Workbook definition is passed to the Module Factory as normal Workbook compositor inserts formula into Module_1 Input1 cell 1909 to link it to the input cell 1908 in the interface module 1902. E.g. "=Inputs!Input1".

Note that the above workflow assumes that the user has already fully specified the inputs and outputs of the model through the appropriate DataFlow mappings.

A UIM will typically be the only part of a spreadsheet-based user-defined application that is visible to the end user. The complete dynamically composited workbook will be constructed on, or streamed to, their device, but all functional modules will be marked as "Hidden". One aim of such an approach is to create a user interface that does not appear to be a spreadsheet, hence giving the appearance of a custom software application. In this way, spreadsheet users can define sophisticated user-defined applications simply by designing a spreadsheet and assigning input and output cells within it.

A preferred embodiment is to have the spreadsheet user-interface modules loaded by an application designed for such use (the "UI Loader"), and the application uses the formatting defined by the designer to build the user interface.

In one embodiment of the UIM architecture the spreadsheet workbook is dynamically composited on a remote device and interaction with the spreadsheet workbook is carried out via remote procedure calls from the users local device which hosts the UI Loader and the user-interface modules.

In a second embodiment of the UIM architecture both the user-interface modules and the composited workbook are located on the user's device.

Note that the user-interface modules need not be completely "dumb" and can for example contain functionality for data validation or data pre-processing. This scenario obviously requires the separate specification of the user-interface modules, rather than the auto-create embodiment discussed above. The separate design-time specification of user-interface modules is performed in the same manner as any other module.

Although the user-interface embodiments discussed so far have been spreadsheet-based, this is neither a limitation nor necessity of the present teachings. Any other software development tool, e.g. Microsoft Windows Presentation Foundation (WPF), Microsoft Silverlight, Adobe Air etc could be used to create a user interface for a dynamically composited workbook. The advantage of using a spreadsheet-defined thin-client user interface is that it can be built by users who do not have any software development skills.

Networked Modules

Our approach of using a dataflow mapping definition for each input and output provides an elegant way of defining networked user-interface modules that are streamed automatically to a user's device when a workbook is requested by the user. An exemplary configuration is illustrated in FIG. 20 (*a*) and a workflow for building the functional workbook and the user interface workbook is shown in FIG. 20 (*b*).

Figure 20B:
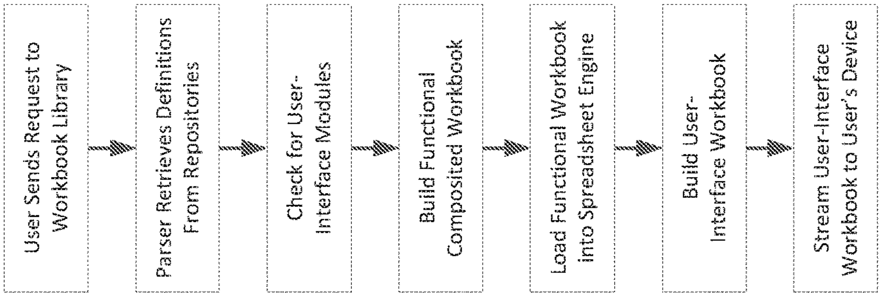
FIGS. 20(*a*) and (*b*): Exemplary architecture for a networked thin-client module and related workflow.
Figure 20A:
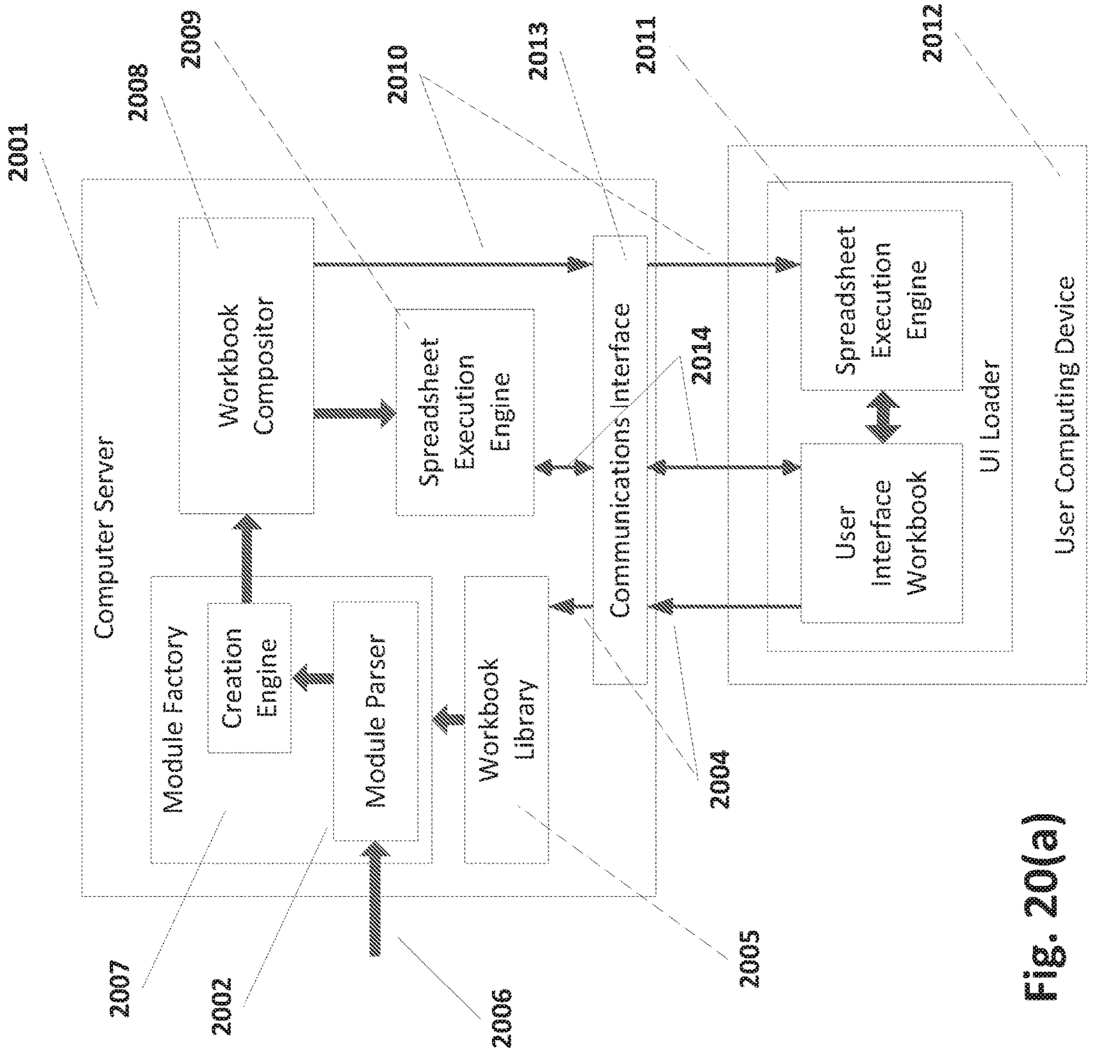

In FIG. 20 (*a*) we have a computer server 2001 that hosts a module parser 2002 and a workbook compositor 2003. The user requests a workbook 2004 from a library of available workbooks 2005 and the required modules are retrieved from the repositories 2006. The modules are built from the definitions in the module factory 2007 and then passed to the workbook compositor 2008. If the workbook definition indicates that user-interface worksheets are to be created then the compositor 2008 creates two workbooks.

Firstly the functional workbook is composited as usual and passed to the spreadsheet engine 2009. Secondly, the user-interface (UI) workbook is created and then streamed 2010 to the UI Loader 2011 on the user's device 2012. The decision to stream the user-interface worksheet can be determined by a property of the module definition. For example, referring again to FIG. 3 we have an IsLocal property: If this is set equal to False then the system streams it to the requesting device.

The UI Loader has been discussed previously and is a skeleton spreadsheet application with network communications functionality. Note that all network communications between the user's device and the server are mediated through the communications interface 2013. After the user-interface workbook has been loaded, the UI Loader sends and receives the input and output values 2014.

Note that in the embodiment of FIG. 20 (*a*) we have assumed a configuration where a binary worksheet object containing the user interface worksheets object(s) is streamed to the user's device. This is only one possible embodiment and we have used this to illustrate another example of how both module definitions and workbook objects can be used simultaneously in our approach. Further architectural embodiments for dynamically composited workbooks will be discussed at a later point in these teachings.

We stress that our approach does not constitute a distributed spreadsheet engine: This is not the focus of these teachings. Data flow across a computer network in our system is restricted to flows between Inputs and outputs: Internal interface members cannot be used since they could be involved in intermediate calculations within the composite model.

Offline Working

When a dynamically composited workbook is streamed to a network-connected device, our approach also allows for the composited workbook to be cached for off-line working. Upon re-connection to the network the workbook loader will automatically check for any changes to constituent modules and update them on the user's device accordingly.

Advantageously, our approach also allows for local caching of module definitions. This in turn means that a single module definition could be used for multiple different composited workbooks on a given device.

Module Testing

An advantage of our approach is that multi-module spreadsheet models and workbooks become formally testable: If a change is made to the internal implementation of a module then that module can be tested in isolation without affecting the rest of the model or workbook. The use of an Interface Definition Language means that a test plan can be defined against the interface.

To facilitate such testing we introduce the concept of a Test Data Module (TDM). This is essentially a Static Data Module but with a property indicating that it is for testing purposes only: For example, see the <IsTestModule> property shown in FIG. 15.

It will essentially comprise a set of test scenarios for the associated module. In addition, a TDM incorporates a set of output values that are known to be correct and against which any test runs can be compared.

Implementation Architectures

The flexibility afforded by using interface definitions and dynamic workbook composition means that there are a number of possible architectural embodiments, which we now discuss. In the following exemplary architectures we consider only the case of a single repository: This is simply to illustrate the concepts and it will be clear that the architectures can be extended to include multiple repositories. In addition, the exemplary embodiments illustrate scenarios where the user has access only to a list of workbook definitions, with the module and model definitions hidden. Other implementations can obviously include access to any combination of workbook, module and model definitions.

Although a range of different architectures can be devised, we consider three examples that taken together illustrate the key concepts:

Single device architecture

Streamed modules architecture

Streamed workbooks architecture

Single Device Architecture

Figure 21:
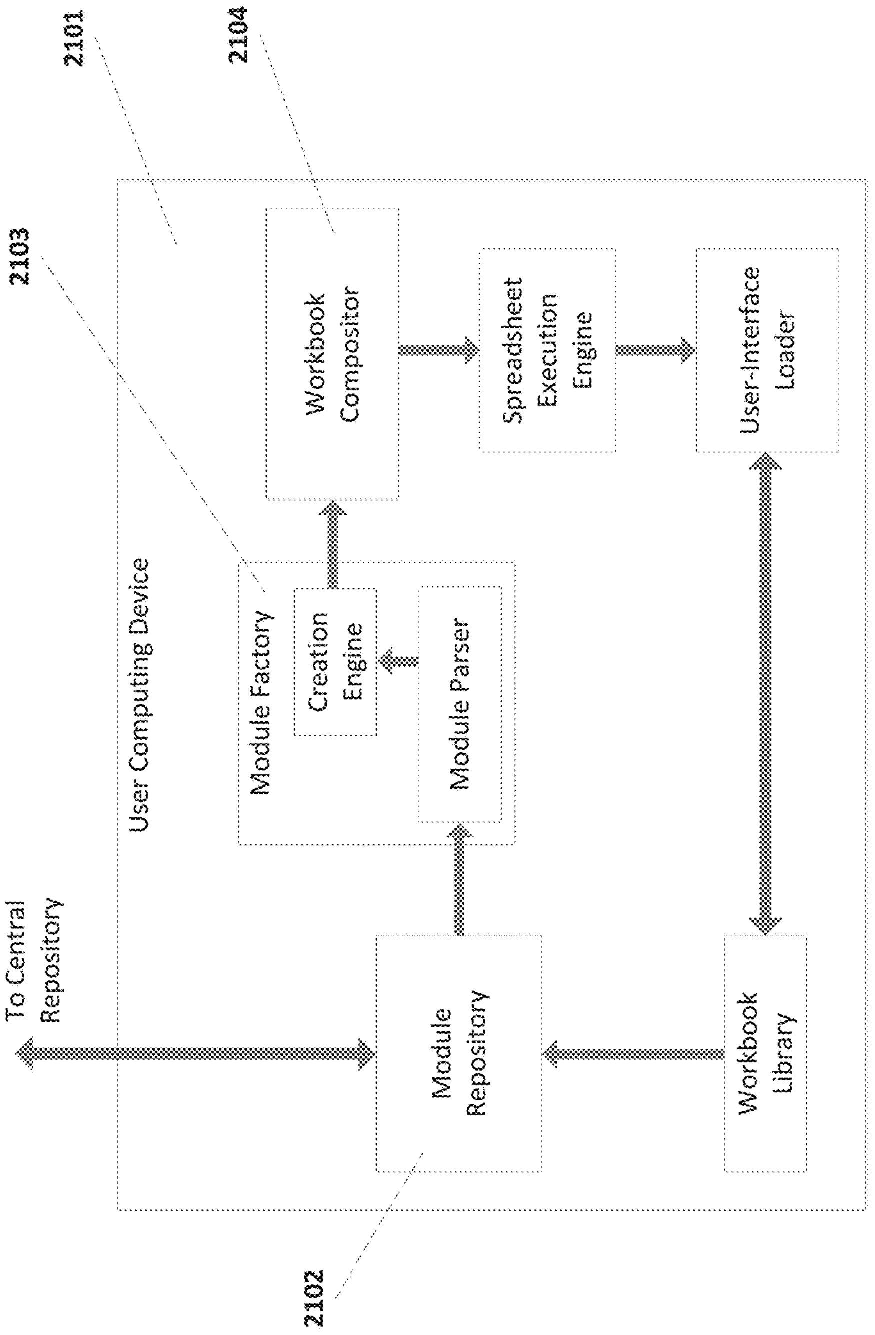
FIG. 21: Exemplary architecture for a single-device dynamically composited workbook system.

Examples of the single-device architecture have already been implicitly discussed, but for completeness we show an exemplary schematic in FIG. 21. It is important to note that the details of the embodiment structure in FIG. 21 can be implemented in a number of ways, and the embodiment shown is not intended to be exclusive. In the single device architecture the module repository 2102, module factory 2103 and workbook compositor 2104 are all physically located on the same device 2101. In this embodiment we assume that the user has access only to a list of workbook definitions, i.e. the Workbook Library 2105. In alternative embodiments a user might have access to a module or model library, as has been discussed earlier.

The single device architecture can be extended to allow both the module repository 2102 and the workbook library 2105 on the device to be updated from a central repository. The key feature of this example implementation architecture, i.e. the module discovery and composition being located on a single device, is preserved.

Streamed Modules Architecture

Figure 22:
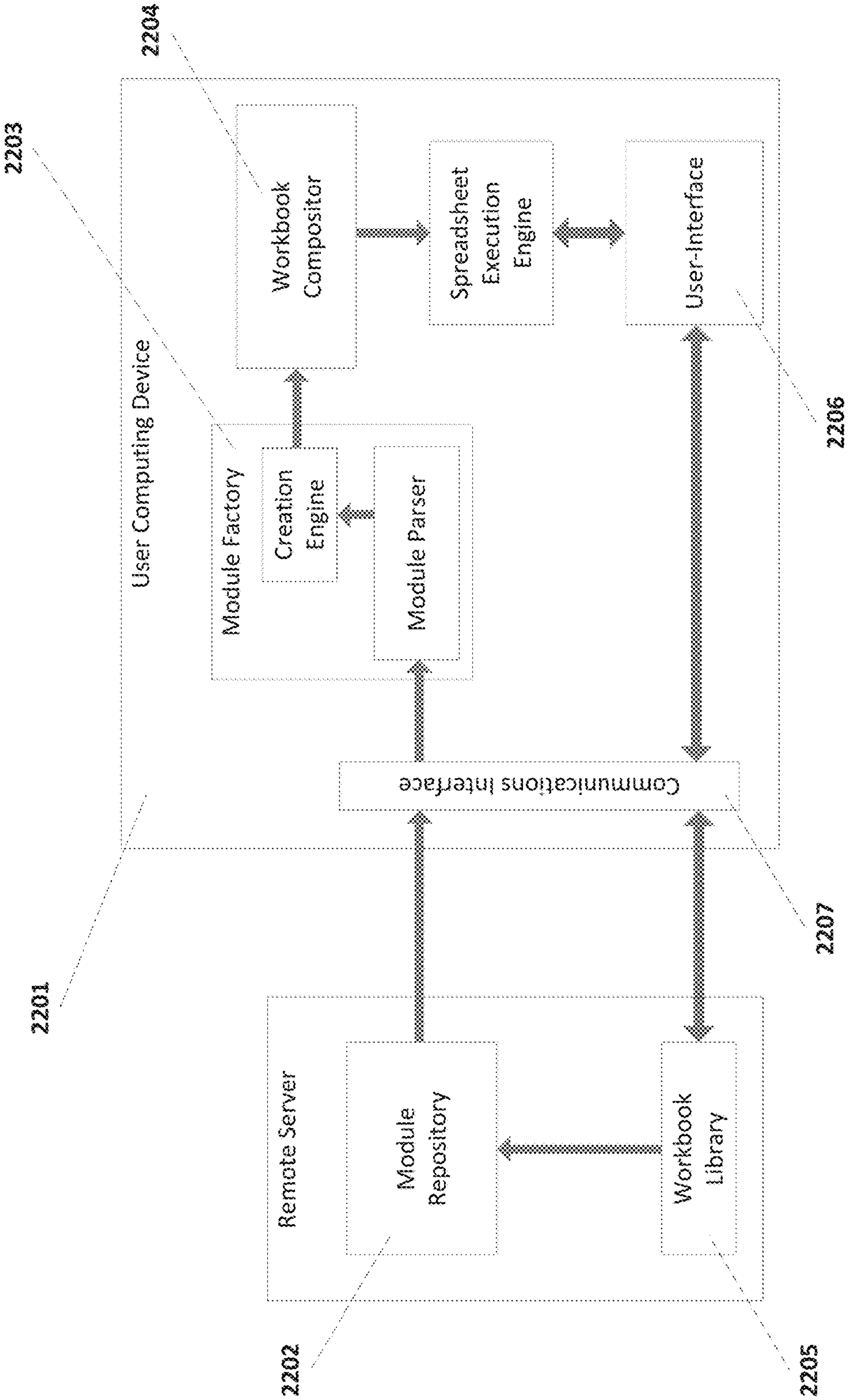
FIG. 22: Exemplary architecture for a streamed-modules dynamically composited workbook system.

The Streamed Modules Architecture is illustrated in FIG. 22 from which we can see that it requires a module factory 2203 and workbook compositor 2204 to be present on the users' device, but with the module repository 2202 and workbook library 2205 located on a separate device.

The user interface 2206 presents a list of available workbooks through the communications interface 2207. When the user selects a workbook the required modules are obtained from the module repository 2202 and downloaded to the user's device. On the user's device the modules are processed by the module factory 2203 and workbook compositor 2204 before being loaded into the spreadsheet engine for subsequent presentation to the user.

One operational mode of this architecture involves a mixture of locally cached modules and modules streamed over the network. In certain applications, e.g. on mobile networks where bandwidth can be restricted, this mixed-mode approach can be advantageous in conserving resources. For example, if a composited workbook uses a large amount of static data then it makes sense to cache the associated Data Modules on the user's device.

Streamed Workbooks Architecture

Figure 23:
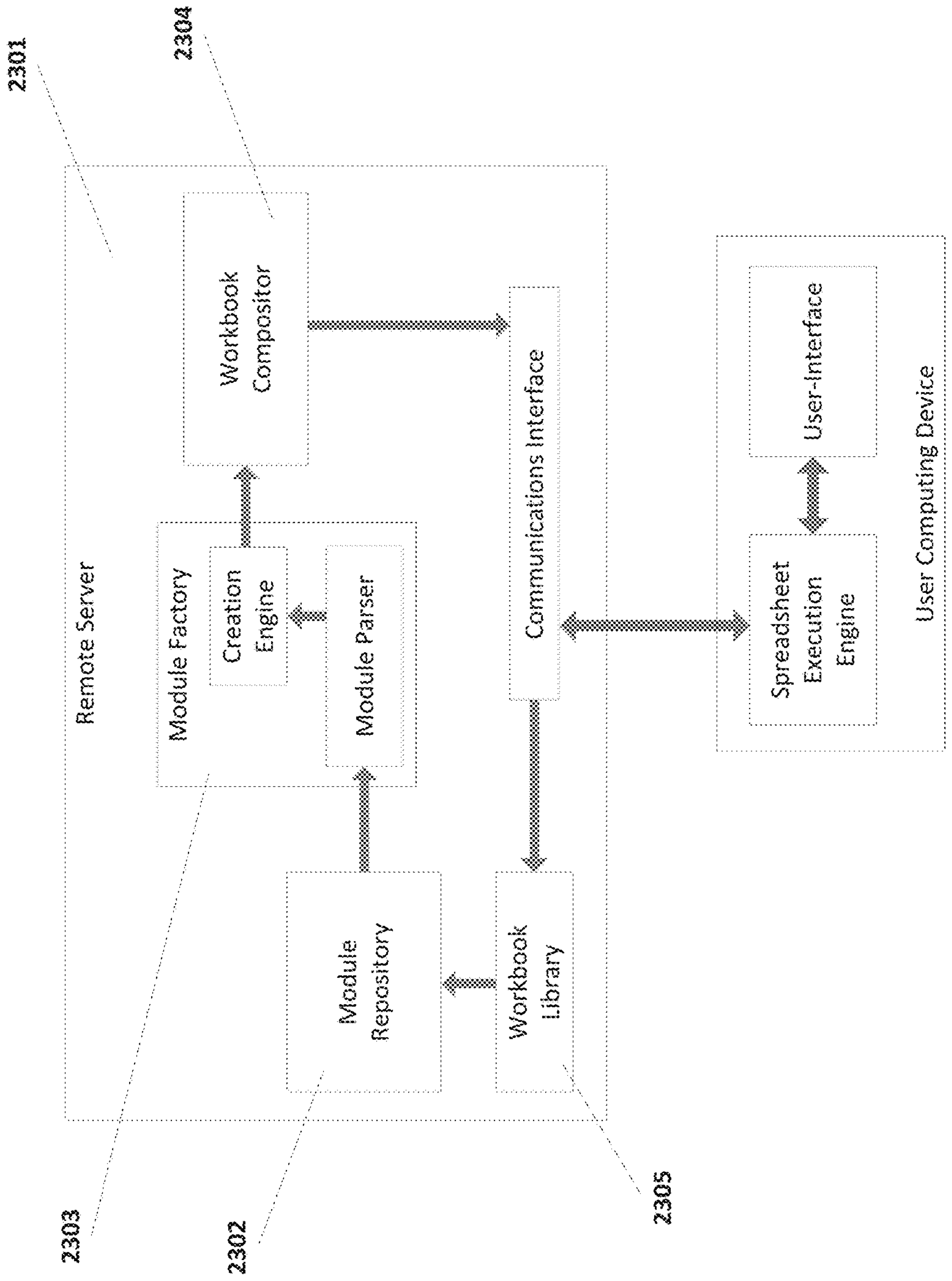
FIG. 23: Exemplary implementation of a streamed workbooks architecture.

An exemplary implementation of the streamed workbooks architecture is illustrated in FIG. 23. An advantage of this architecture is that the user's device need not have a factory and compositor installed—only the spreadsheet engine and the user interface. As before, the user browses a list of workbooks made available through the workbook library. The steps leading to the workbook composition follow the same sequence as in the previous example architectures, except that all the steps are executed on the remote device.

The composited workbooks are then streamed to the user's device.

Spreadsheet Services

The exemplary architectures considered up to this point all have in common an interaction with the dynamically composited workbook that is via a user interface module or worksheet, either embedded within the workbook or operating as a remote proxy. A commonly used spreadsheet architecture is so-called Spreadsheet Services, where the input values are dispatched to a remote server where the spreadsheet calculations are performed and the output values then dispatched back to the client device, all using some form of network protocol. In this architecture the spreadsheet engine is obviously located on the remote server. The remote server itself typically hosts a web server, with client-server communications normally being based on the HTTP protocol.

Figure 24:
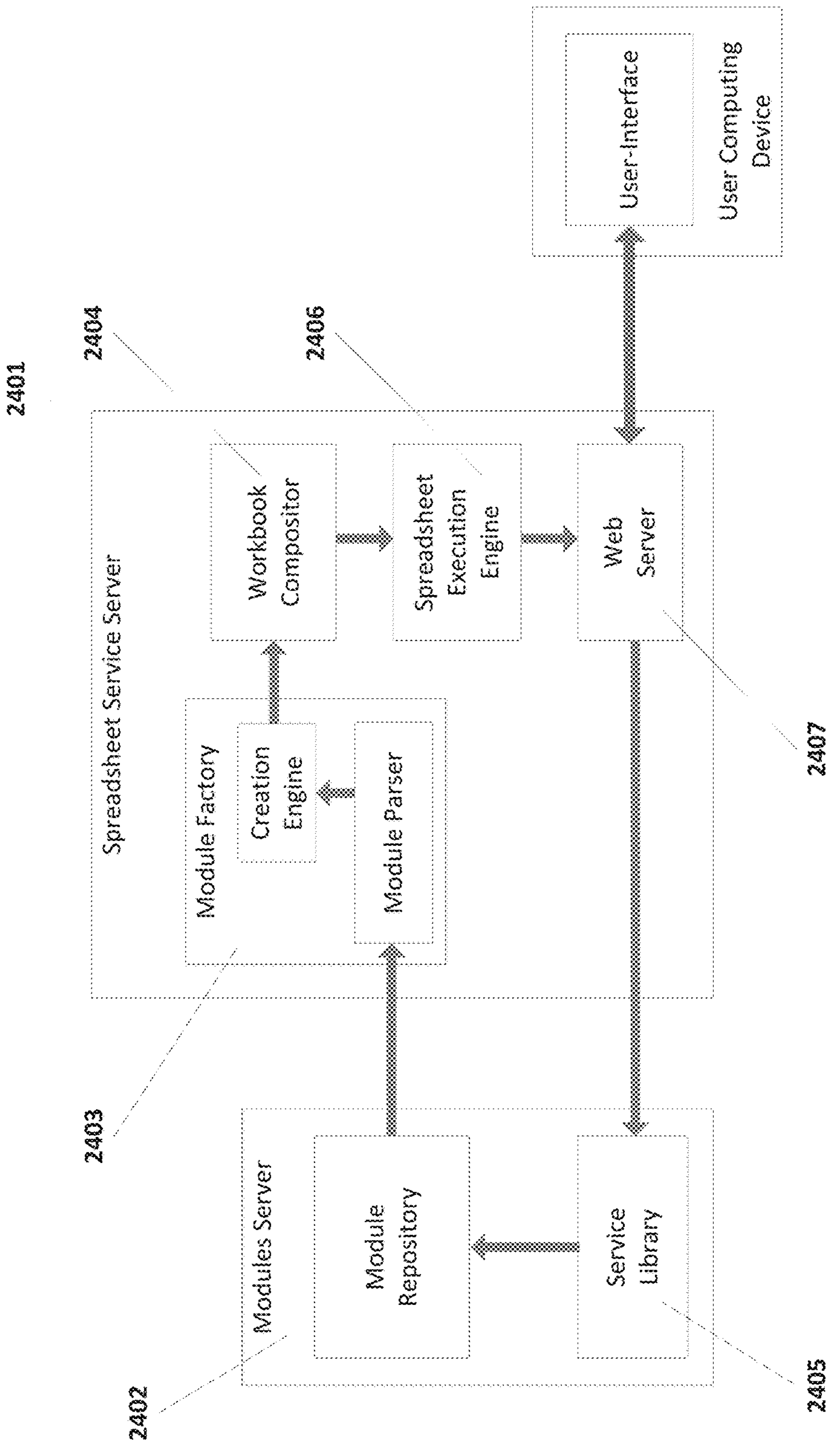
FIG. 24: Exemplary implementation of a spreadsheet services architecture using dynamically composited workbooks.

The dynamically composited approach described in these teachings provides a powerful framework for spreadsheet services, and an exemplary implementation is illustrated in FIG. 24. Note that this embodiment uses the streamed modules architecture to deliver modules from a modules server 2402 to the spreadsheet service server 2401. It is important to realise that the architecture used to generate the composited workbook illustrated in FIG. 24 is not the only one possible: Various combinations of the architectures previously discussed could also be employed. For example, the spreadsheet services architecture could also use the streamed workbooks or the single device architectures described above.

Grid Processing

The structured modular nature of a composited workbook makes it amenable to calculation on distributed processing architectures. The methods and architectures described in these teachings can be used for distributing modules around a computational grid (i.e. a network of connected computing devices), where each node (or computing device) hosts a dynamically composited workbook, and where the individual modules can communicate their current state to other modules. The required data flow in the grid is defined by the module connections that are defined by the user, and these definitions are held by each module in the grid. Each module therefore knows which modules to dispatch it's results to.

In one implementation, a consolidator node would act as the destination point for the various outputs from the other nodes in the grid. Each of the other nodes would hold an identical composited workbook, hence allowing calculations to be "scaled out" and run in parallel. Applications for this type of architecture would include Monte Carlo simulations and similar sampling problems.

In a second embodiment, a number of different module or composited workbook types would be distributed around the grid. For example, calculations that take more time could have multiple modules assigned while faster calculations might only need a single module. In other words, there is no requirement for all nodes on a grid to be running the same dynamically composited workbook.

In a further embodiment, dynamically-composited workbooks on each node can be instantiated (i.e. created) through a web service call to a compiled library function or script that in turn executes the code that specifies how the workbook is constructed. In one possible embodiment, the spreadsheet engine will have an integrated web server that exposes the required function calls to remote devices. The new workbook would then be dynamically composited directly within the spreadsheet engine. There are of course other possible implementations, including creating the workbook within a separate process and then loading it into the spreadsheet engine. These other possible configurations will be apparent to those skilled in the art.

In a further possible embodiment, the web service call that instantiates the workbook can also include the input parameters required for the computation. Alternatively, the input values can be dispatched via a subsequent web service call.

The modules, module definitions and compiled libraries (and/or scripts) used to instantiate a dynamically composited workbook can be uploaded to the grid nodes from a central controlling device (i.e. a "push" model). Alternatively, they can be "pulled" by the nodes from one or more connected devices upon receipt of an instruction from the central controlling device.

In an example of a "Pull" architecture, a central job dispatcher that manages the execution of computational jobs would send a "NewJob" command to each of the grid nodes with the appropriate input parameters. Each node would then retrieve all entities required to run the job, either from the computing device that hosts the job dispatcher, or from one or more other devices that have been designated as repositories. The entities retrieved would be (i) modules and/or module definitions (in which case the node would comprise a module factory and compositor as has been discussed earlier) or (ii) One or more binary libraries or scripts that provide workbook instantiation functions.

The same "mapping by convention" approach described in the section on user-interface modules can be employed in a grid architecture for moving values around the grid: I.e. values are mapped according to the name of the source/destination cell (or range). In fact the approach can be extended to define a simple way to map inputs and outputs in a grid. For example, a node workbook might calculate an output value (say "ValueA") that is in turn required as an input to another workbook on another node. The node with the output value then broadcasts a message with the new output value and the name of source cell (or range). When the message is received by other nodes they check for an input cell (or range) with the matching name and, if found, insert the new value into the appropriate workbook. By using convention the mappings between different workbooks on a grid need not be managed centrally—only the node need be aware of which cells are inputs and which are outputs.

The approach described above is useful for architectures where some nodes provide calculated values for other nodes. In a further embodiment the same calculation is performed on each node. In this embodiment the same input parameters are dispatched from a controlling application to each of the nodes on a grid. The controlling application broadcasts a message with a payload comprising a list of the input parameter values and names. The payload also includes the location of the controlling application on the network, or the location of an alternative computing device that acts as a results consolidator. Upon receipt at each node, the named parameter values are mapped using convention to the appropriate input cells (or ranges) and the composited workbook is recalculated. Upon completion of the calculations each node builds a new payload comprising a list of output values and associated names, which is in turn dispatched to the specified consolidator. This architecture is appropriate for applications where the calculations on a particular node do not depend on those executed on a different node.

These teachings therefore describe a number of ways in which we can build powerful distributed calculation engines using dynamically composited workbooks, which in turn can be scaled up for cloud-based applications.

User Defined Applications

Thus far we have described the underlying methods required to define and instantiate a dynamically composited workbook. We have described how our approach allows for the dynamic composition of spreadsheet workbooks in a manner that does not affect the standard spreadsheet user experience—i.e. the spreadsheet can be presented to the user in a standard document-centric manner. We have also described methods for defining user-interface modules that allow us to present a spreadsheet model in a manner that disguises the underlying spreadsheet nature of the model.

Our approach therefore provides a means of building User Defined Applications (UDA) based on spreadsheets that does not require the involvement of professional software developers. By dynamically modifying styles and module mappings such UDAs can also be made dynamically configurable, depending on, for example, the access permissions of the user or the usage context. The mappings for such dynamic configuration would be incorporated into the top-level definition of the composited workbook, e.g. such as that illustrated in FIG. 11.

One example of such a system is a statistical data analysis and data mining system. Such systems are currently built using a code-centric approach—i.e. computer programs that perform the required calculations and present the resulting values in a format determined by the system developer.

The present teachings provide a system and methods for creating and operating a software system capable of providing data management and computing services such as, but not limited to, data retrieval, data analysis, data mining, data reporting, business process simulation, workflow management and business process management.

Various modifications and improvements can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

The invention claimed is:

1. A data processing system comprising:

one or more repositories, each repository containing one or more spreadsheet module definitions, and each spreadsheet module definition comprising module definition software code specifying one or more spreadsheet objects;

a computer software application or linked library used by a computing device having an operational memory, the computer software application or linked library acting as a module factory that executes module definition software code associated with the one or more spreadsheet module definitions to create a spreadsheet workbook and provides the created spreadsheet workbook in the operational memory of the computing device; and a spreadsheet engine used by the computing device into which the spreadsheet workbook is loaded after creation and which manages and executes the spreadsheet workbook;

the data processing system thus providing a runtime dynamically generated spreadsheet workbook.

2. The data processing system of claim 1 where relationships between different module definitions are defined by one or more module interface definitions and associated data flows which define mappings between module inputs and outputs.

3. The data processing system of claim 2 which includes a module compositor that generates composited workbooks from the one or more spreadsheet objects and the one or more module interface definitions.

4. The data processing system of claim 1 comprising one or more definition repositories which store one or more of: (a) a module interface definition (MID); (b) a module definition (MD); and (c) a data flow definition.

5. The data processing system of claim 4 where the one or more definition repositories are located on one or more computer network connected devices.

6. The data processing system of claim 4 where the one or more definition repositories are located on a user's computing device.

7. The data processing system of claim 1 where the one or more spreadsheet module definitions are categorized according to whether they are functional, data, reporting, data visualization, or visual styling.

8. The data processing system of claim 1 where a spreadsheet module comprises multiple sub-modules.

9. The data processing system of claim 1 where the module definition software code is stored in: (a) a file; or (b) a database.

10. The data processing system of claim 1 where the module definition software code is stored in a version control system.

11. The data processing system of claim 1 where the module definition software code from more than one spreadsheet module definitions is combined to create a composite workbook definition.

12. The data processing system of claim 3 where the module compositor generates module definition software code that creates links between the one or more spreadsheet objects as specified in data flow definitions.

13. The data processing system of claim 11 where the module definition software code defining the composite workbook definition is executed in a scripting engine.

14. The data processing system of claim 11 where the module definition software code defining the composite workbook definition is compiled into a binary software application or library and exposed as a function or procedure call.

15. The data processing system of claim 14 where the spreadsheet workbook is obtained as a returned value from the function or procedure call.

16. The data processing system of claim 2 where at least one module interface definition can act as an ancestor to a descendent module interface definition; and/or at least one spreadsheet module definition can act as an ancestor to a descendent spreadsheet module definition.

17. The data processing system of claim 1 where a globally unique identifier (GUID) identifies one or more of: (a) a module interface definition (MID); (b) a module definition (MD); (c) a data flow definition; and (d) a composited spreadsheet workbook.

18. The data processing system of claim 1 where custom attributes are injected into the spreadsheet workbook and its constituent worksheets at runtime.

19. The data processing system of claim 1 wherein the one or more spreadsheet module definitions comprise reporting definitions, functional definitions, and styling definitions; and wherein the reporting, functional, and styling definitions are separated from each other.

20. The data processing system of claim 1 where spreadsheet modules are composited to appear to a user as: (a) a standard single spreadsheet workbook user interface; or (b) a styled user interface with the spreadsheet functionality concealed.

21. The data processing system of claim 1 that comprises a software code compiler.

22. The data processing system of claim 21 where the software code compiler generates compiled code libraries of worksheet functions.

23. The data processing system of claim 22 where the software code compiler generates compiled code libraries exporting functions that in turn generate spreadsheet objects such as worksheets.

24. A method of data processing comprising:

providing one or more repositories, each repository containing one or more spreadsheet module definitions, and each spreadsheet module definition comprising module definition software code specifying one or more spreadsheet objects;

providing a computer software application or linked library for use by a computing device having an operational memory, the computer software application or linked library acting as a module factory that executes module definition software code associated with the one or more spreadsheet module definitions to create a spreadsheet workbook and provides the created spreadsheet workbook in the operational memory of the computing device; and providing a spreadsheet engine for use by the computing device into which the spreadsheet workbook is loaded after creation and which manages and executes the spreadsheet workbook;

the data processing method thus providing a runtime dynamically generated spreadsheet workbook.

25. A computer program product comprising a non-transitory computer-readable medium and instructions, that, when executed on a computing device, enable it to function as a data processing system or as a client or viewer of such a data processing system; the data processing system comprising:

one or more repositories, each repository containing one or more spreadsheet module definitions, and each spreadsheet module definition comprising module definition software code specifying one or more spreadsheet objects;

a computer software application or linked library for use by a computing device having an operational memory, the computer software application or linked library acting as a module factory that executes module definition software code associated with the one or more spreadsheet module definitions to create a spreadsheet workbook and provides the created spreadsheet workbook in the operational memory of the computing device; and a spreadsheet engine for use by the computing device into which the spreadsheet workbook is loaded after creation and which manages and executes the spreadsheet workbook;

the data processing system thus providing a runtime dynamically generated spreadsheet workbook.

* * * * *